United States Patent
Yamaguchi et al.

(10) Patent No.: US 8,649,026 B2
(45) Date of Patent: Feb. 11, 2014

(54) PAPER-SHEET MANAGEMENT METHOD AND PAPER-SHEET MANAGEMENT SYSTEM

(75) Inventors: Takayuki Yamaguchi, Hyogo (JP); Ryosuke Minami, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 169 days.

(21) Appl. No.: 13/401,027

(22) Filed: Feb. 21, 2012

(65) Prior Publication Data
US 2012/0243056 A1 Sep. 27, 2012

(30) Foreign Application Priority Data
Feb. 23, 2011 (JP) .................. 2011-037422

(51) Int. Cl.
*G06K 1/00* (2006.01)
*H04N 1/40* (2006.01)
*G06K 9/18* (2006.01)
*G07D 7/12* (2006.01)
*G06K 9/74* (2006.01)

(52) U.S. Cl.
USPC ............ 358/1.1; 358/462; 382/137; 382/182; 356/71; 194/302

(58) Field of Classification Search
USPC .............. 358/1.1, 462; 382/137, 182; 356/71; 194/302
See application file for complete search history.

(56) References Cited

U.S. PATENT DOCUMENTS

| | | | |
|---|---|---|---|
| 7,739,499 B2 * | 6/2010 | Ramirez et al. ............... | 713/168 |
| 2004/0238619 A1 | 12/2004 | Nagasaka et al. | |
| 2008/0106726 A1 * | 5/2008 | Park .............................. | 356/71 |
| 2011/0170761 A1 | 7/2011 | Fu | |

* cited by examiner

*Primary Examiner* — Charlotte M Baker
(74) *Attorney, Agent, or Firm* — Renner, Kenner, Greive, Bobak, Taylor & Weber

(57) ABSTRACT

A first identification number obtained by performing character recognition of each of a plurality of digits of an identification number and allocating predetermined characters to digits where characters cannot be determined and a second identification number representing an identification number that is the target of character recognition processing or search processing are compared with each other by calculating a matching ratio between the two numbers. When the matching ratio is lower than a predetermined reference value, a shifted identification number obtained by shifting each character forming the first identification number one digit in a predetermined direction and the second identification number are compared with each other by calculating a matching ratio between the two numbers. If this matching ratio is equal to or higher than the predetermined reference value, subsequent processing is continued, so that the shifted identification number is treated as the first identification number.

15 Claims, 15 Drawing Sheets

FIG.7

| SERIAL NUMBER A | A | B | 1 | 2 | 3 | 4 | 5 | 6 | C |
|---|---|---|---|---|---|---|---|---|---|

| SERIAL NUMBER B | ? | A | B | ? | ? | 3 | 4 | 5 | 6 | C |
|---|---|---|---|---|---|---|---|---|---|---|
| | – | N | N | – | – | N | N | N | N | N |

↓

| SHIFTED SERIAL NUMBER B | ? | A | B | ? | ? | 3 | 4 | 5 | 6 | C |
|---|---|---|---|---|---|---|---|---|---|---|
| | | Y | Y | – | – | Y | Y | Y | Y | Y |

FIG.8

| SERIAL NUMBER A | A | ? | 1 | 2 | 3 | 4 | 5 | 6 | C |
|---|---|---|---|---|---|---|---|---|---|

| SERIAL NUMBER B | ? | A | B | ? | ? | 3 | 4 | 5 | 6 | C |
|---|---|---|---|---|---|---|---|---|---|---|
| | – | N | N | – | – | N | N | N | N | N |

↓

| SHIFTED SERIAL NUMBER B | ? | A | B | ? | ? | 3 | 4 | 5 | 6 | C |
|---|---|---|---|---|---|---|---|---|---|---|
| | | Y | N | – | – | Y | Y | Y | Y | Y |

FIG.9

| SERIAL NUMBER A | A | B | 6 | 6 | 5 | 9 | 1 | 2 | 7 | 7 | C |
|---|---|---|---|---|---|---|---|---|---|---|---|

| SERIAL NUMBER B1 | ? | ? | A | B | 6 | 6 | 5 | 9 | 1 | 2 | 7 | 7 | C |
|---|---|---|---|---|---|---|---|---|---|---|---|---|---|
| | — | — | N | N | N | N | N | N | N | N | N | N | N |

↓

| SHIFTED SERIAL NUMBER B1 | ? | ? | A | B | 6 | 6 | 5 | 9 | 1 | 2 | 7 | 7 | C |
|---|---|---|---|---|---|---|---|---|---|---|---|---|---|
| | | | Y | Y | Y | Y | Y | Y | Y | Y | Y | Y | Y |

| SERIAL NUMBER B2 | B | 6 | 6 | 5 | 9 | 1 | 2 | 7 | 7 | C | ? |
|---|---|---|---|---|---|---|---|---|---|---|---|
| | N | N | Y | N | N | N | N | N | Y | N | — |

↓

| SHIFTED SERIAL NUMBER B2 | — | B | 6 | 6 | 5 | 9 | 1 | 2 | 7 | 7 | C | ? |
|---|---|---|---|---|---|---|---|---|---|---|---|---|
| | — | Y | Y | Y | Y | Y | Y | Y | Y | Y | Y | |

FIG.10

| SERIAL NUMBER A | I | L | 1 | 9 | 5 | 0 | 8 | 8 | 5 | 4 | A |

| SERIAL NUMBER B | ? | I | ? | 1 | 9 | 5 | 0 | 8 | 8 | 5 | ? |
|---|---|---|---|---|---|---|---|---|---|---|---|
| | – | N | – | N | N | N | N | Y | N | N | – |

↓

| SHIFTED SERIAL NUMBER B | ? | I | ? | 1 | 9 | 5 | 0 | 8 | 8 | 5 | ? | ? |
|---|---|---|---|---|---|---|---|---|---|---|---|---|
| | Y | – | Y | Y | Y | Y | Y | Y | Y | – | – | |

FIG.11

| SERIAL NUMBER A | I | L | 1 | 9 | 5 | 0 | 8 | 8 | 5 | ? | A |

| SERIAL NUMBER B | L | ? | 9 | ? | 0 | 8 | 8 | 5 | 4 | ? | ? |
|---|---|---|---|---|---|---|---|---|---|---|---|
| | N | – | N | – | N | N | Y | N | N | – | – |

↓

| SHIFTED SERIAL NUMBER B | ? | L | ? | 9 | ? | 0 | 8 | 8 | 5 | 4 | ? | ? |
|---|---|---|---|---|---|---|---|---|---|---|---|---|
| | – | Y | – | Y | – | Y | Y | Y | Y | Y | – | |

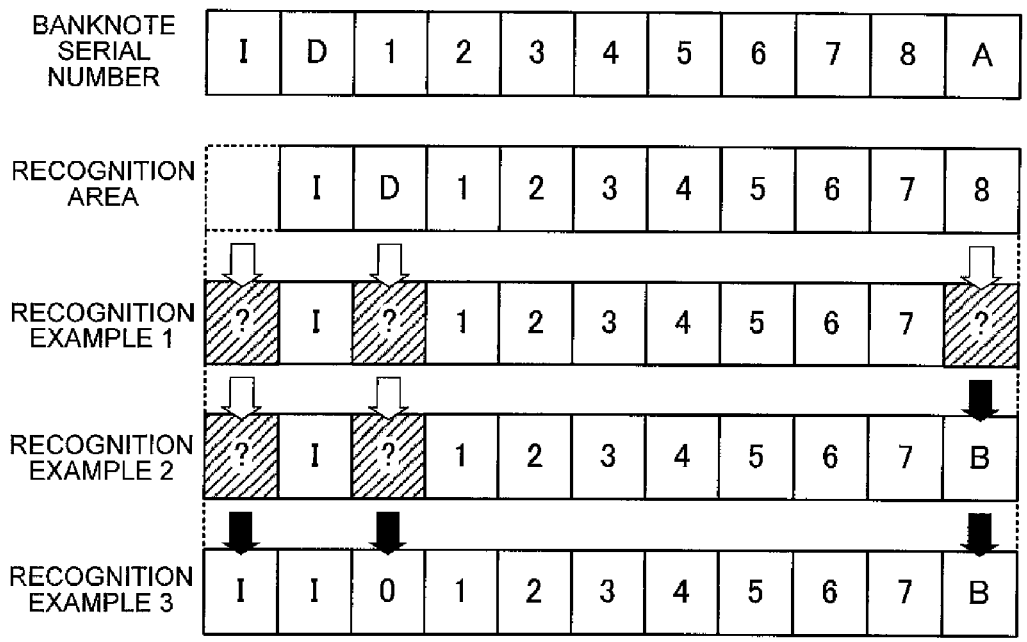
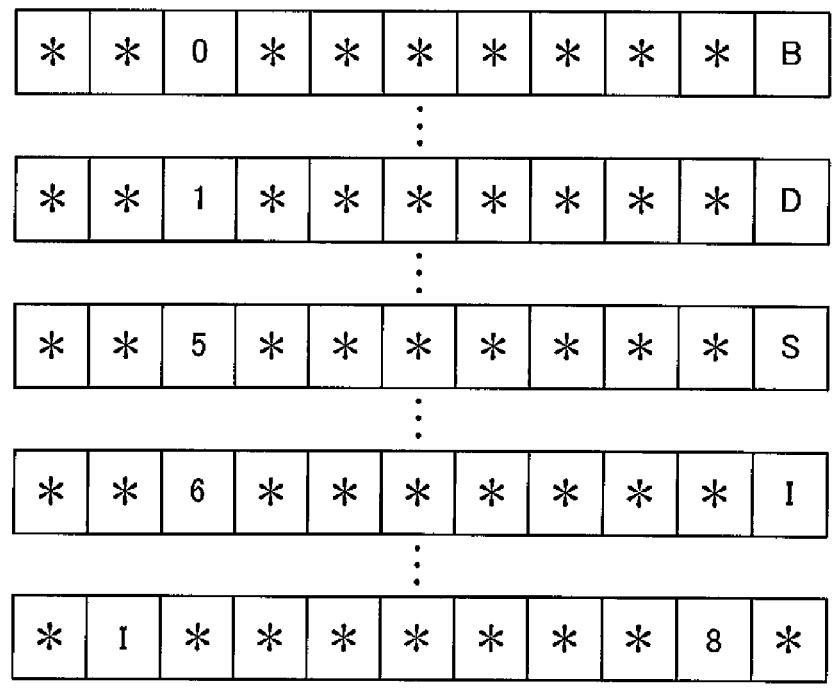

FIG.15

| ? | * | ? | * | * | * | * | * | * | * | ? |
| ? | * | 0 | * | * | * | * | * | * | * | ? |
| ? | * | 1 | * | * | * | * | * | * | * | ? |
| ? | * | 5 | * | * | * | * | * | * | * | ? |
| ? | * | 6 | * | * | * | * | * | * | * | ? |
| ? | * | 8 | * | * | * | * | * | * | * | ? |
| ? | * | ? | * | * | * | * | * | * | * | B |

⋮

| * | ? | * | * | * | * | * | * | * | ? | ? |

⋮

PAPER-SHEET MANAGEMENT METHOD AND PAPER-SHEET MANAGEMENT SYSTEM

BACKGROUND OF THE INVENTION

1. Field of the Invention

The present invention relates to a paper-sheet management method and a paper-sheet management system that perform character recognition of an identification number printed on a paper sheet and use the identification number to manage the paper sheet. The present invention in particular relates to a paper-sheet management method and a paper-sheet management system with which it is possible to perform character recognition of the identification number and search of the registered identification number that has been subjected to character recognition while suppressing an effect of digit shift.

2. Description of the Related Art

A unique identification number that identifies a paper sheet is printed on paper sheets, such as, banknotes, checks, drafts, and gift coupons. In the case of the banknotes, the identification number is called a serial number. Financial institutions require character recognition of the serial numbers of banknotes being transacted to be performed and the serial numbers to be automatically registered in a database. For example, if a counterfeit note is found, the database will be helpful for determining whether the transaction of the counterfeit note were occurred in-house.

To build the database of the serial numbers of the banknotes, it is essential that the serial numbers to be registered as data be correctly recognized. However, in reality, it is not always possible for all the characters composing the serial number to be recognized correctly due to staining, etc., of the banknotes. In such cases, a user has to visually recognize and manually enter the characters that could not be recognized by character recognition. If such unrecognizable characters are in large numbers, the work burden of the user can be rather heavy.

As a solution to the above-mentioned problem, for example, a method of allocating an error character to an unrecognizable character and automatic registration of the serial number is proposed in Japanese Patent Application Laid-open No. 2004-213559. Specifically, if each character of the serial number is considered as a digit, an error character is allocated to each digit that could not be recognized by optical character recognition (OCR), etc., and the recognition process of the serial number is automatically ended, thereby sparing the user manual entry by visual recognition. When it is hard to recognize a character, since an error character can be allocated to the unrecognizable character, misrecognizing can be prevented, and the work burden of the subsequent user can be reduced. A predetermined character, such as, "?" can be used as the error character.

Furthermore, a serial number database building method using error characters and a transaction history management method using serial numbers are proposed in International Publication No. WO2010/032335. In this method, which is developed with an object to reduce the user's work in the character recognition process, an upper limit for the number of error characters is set as a predetermined condition, and the user is only required to perform visual recognition if the condition is not satisfied. Similarly, when searching for a serial number in the database, searching is performed under a predetermined condition, such as, if the number of error characters is within the upper limit or if a particular digit is not allocated with the error character.

However, if there occurs a digit shift of characters of the character-recognized serial number due to staining or scribbling on the banknote, the above-mentioned conventional techniques cannot recognize this digit shift. If such a digit-shifted serial number is registered in the database, the searched serial number cannot be found because of the digit shift. That is, the database cannot be utilized efficiently.

The presence of stains, scribbling, a background design or a colored portion in the front or back of the serial number can lead to miss-recognition of a presence of a character before the actual first character or after the actual last character of the serial number, and to a digit shift of the digits composing the serial number in a right direction or a left direction. There can be many instances where the error character is allocated to a digit because a Roman alphabetic character or a numeric character cannot be recognized even though the stain or scribbling was recognized as a character at the digit position. If the number of the error character is within the range of the predetermined condition, the serial number with the digits shifted is automatically registered as it is in the database without the user having to perform visual recognition.

Specifically, the banknote bearing the serial number "AB123456C" can be misrecognized as "?AB123456C" when there is a digit shift in a right direction. Since this serial number includes only one error character, this serial number is automatically registered in the database without the user performing visual recognition. However, a search for a transaction history of the banknote with the serial number "AB123456C" in the database will yield no result because the serial number that is registered in the database is "?AB123456C". Because of the digit shift, comparison of each digit will yield no match. The presence of such digit-shifted serial numbers in the database will not be utilized efficiently.

SUMMARY OF THE INVENTION

The present invention has been made to solve the problems in the conventional technology and it is an object thereof to present a paper-sheet management method and a paper-sheet management system with which it is possible to perform character recognition of the identification number and search of the registered identification number that has been subjected to character recognition while suppressing an effect of digit shift.

According to an aspect of the present invention, a paper-sheet management method of managing a paper sheet based on an identification number printed on the paper sheet includes acquiring a first identification number by performing character recognition on each of a plurality of character data read from a first area in which the identification number is printed on the paper sheet, and allocating a predetermined character when the character recognition is unsuccessful; calculating a first matching ratio representing a ratio by which characters in the same digit in both the first identification number acquired at the acquiring and a second identification number stored in a storage unit match; shifting each character forming the first identification number one digit in a left direction or a right direction when the first matching ratio calculated at the calculating is lower than a predetermined reference value, thereby obtaining a shifted identification number; calculating a second matching ratio representing a ratio by which characters in the same digit in both the shifted identification number shifted at the shifting and the second identification number match, and replacing the first identification number by the shifted identification number when the second matching ratio is equal to or higher than the predetermined reference value.

According to another aspect of the present invention, a paper-sheet management method of managing a paper sheet based on an identification number printed on the paper sheet includes acquiring a first identification number by performing character recognition on each of a plurality of character data read from a first area in which the identification number is printed on the paper sheet, and allocating a predetermined character when the character recognition is unsuccessful; calculating a first matching ratio representing a ratio by which characters in the same digit in both the first identification number acquired at the acquiring and a second identification number stored in a storage unit are matching; judging that there exists a digit shift when the first matching ratio is lower than a predetermined reference value and number of digits in the first identification number exceeds number of digits in the second identification number; cutting character strings composing the first identification number, by a number equal to an excess number of digits calculated at the judging, from the first digit to right direction and from the last digit to left direction; calculating a first-digit-cut second-matching ratio representing a ratio by which characters in the same digit in both a first-digit-cut first identification number obtained by cutting the character strings of the first identification number from the first digit to right direction and the second identification number are matching, and a last-digit-cut second-matching ratio representing a ratio by which characters in the same digit in both a last-digit-cut first identification number obtained by cutting the character strings of the first identification number from the last digit to left direction and the second identification number are matching; and replacing the first identification number, when a higher one between the first-digit-cut second-matching ratio and the last-digit-cut second-matching ratio is equal to or higher than the predetermined reference value, by the first-digit-cut first identification number or the last-digit-cut first identification number that includes the higher of the second matching ratios.

According to still another aspect of the present invention, a paper-sheet management system that manages a paper sheet based on an identification number printed on the paper sheet includes a paper-sheet processing apparatus including an image capturing unit that captures an image of a surface of the paper sheet by scanning the surface, and a transmitting unit that transmits the image; and a paper-sheet management apparatus including a receiving unit that receives the image from the paper-sheet processing apparatus, and a character recognition unit that performs character recognition on each of a plurality of character data read from a first area in which the identification number is printed on the paper sheet, and allocates a predetermined character when the character recognition is unsuccessful; and a character determination unit that calculates a first matching ratio representing a ratio by which characters in the same digit in both a first identification number and a second identification number are matching, shifts each character forming the first identification number one digit in a left direction or a right direction when the first matching ratio is lower than a predetermined reference value, thereby obtaining a shifted identification number, calculates a second matching ratio representing a ratio by which characters in the same digit in both the shifted identification number and the second identification number are matching, and replaces the first identification number by the shifted identification number when the second matching ratio is equal to or higher than the predetermined reference value.

According to still another aspect of the present invention, a paper-sheet management system that manages a paper sheet based on an identification number printed on the paper sheet includes a paper-sheet processing apparatus including an image capturing unit that captures an image of a surface of the paper sheet by scanning the surface, and a transmitting unit that transmits the image; and a paper-sheet management apparatus including a receiving unit that receives the image from the paper-sheet processing apparatus, a character recognition unit that performs character recognition on each of a plurality of character data read from a first area in which the identification number is printed on the paper sheet, and allocates a predetermined character when the character recognition is unsuccessful; and a digit shift judging unit that calculates a first matching ratio representing a ratio by which characters in the same digit in both a first identification number and a second identification number are matching, and judges that there exists a digit shift if the first matching ratio is lower than a predetermined reference value and number of digits in the first identification number exceeds number of digits in the second identification number; a number reducing unit that reduces number of digits of a character string composing the first identification number, by a number equal to an excess number of digits, by cutting character strings of the digits from the first digit to right direction and the last digit to left direction; a second-matching ratio calculating unit that calculates a first-digit-cut second-matching ratio representing a ratio by which characters in the same digit in both a first-digit-cut first identification number obtained by cutting the character strings of the first identification number from the first digit to right direction and the second identification number are matching, and a last-digit-cut second-matching ratio representing a ratio by which characters in the same digit in both a last-digit-cut first identification number obtained by cutting the character strings of the first identification number from the last digit to left direction and the second identification number are matching; and a character determination unit that replaces the first identification number, when a higher one between the first-digit-cut second-matching ratio and the last-digit-cut second-matching ratio is equal to or higher than the predetermined reference value, by the first-digit-cut first identification number or the last-digit-cut first identification number that includes the higher of the second matching ratios, thereby determining the first identification number.

BRIEF DESCRIPTION OF THE DRAWINGS

FIG. 7 is a drawing for explaining a correction method of a digit shift when a digit-shifted character recognition of the serial number is performed;

FIG. 8 is a drawing for explaining a complement process performed after correction of the digit shift in the serial number;

FIG. 9 is a drawing showing examples of serial numbers in which the number of digits by which the digit shift has occurred and a direction in which the digit shift has occurred are different;

FIG. 10 is a drawing for explaining digit shift in a serial number in which the number of digits and a type of character used in each digit are fixed;

FIG. 11 is a drawing for explaining a different digit shift in the serial number in which the number of digits and the type of character used in each digit are fixed;

FIG. 13 is a drawing for explaining a method of judging the digit shift in a serial number in which the number of digits and the type of character used in each digit are fixed;

FIG. 14 is a drawing showing a digit shift decision table of the serial number in which the number of digits and the type of character used in each digit are fixed;

FIG. 15 is a drawing showing the digit shift decision table of the serial number in which the number of digits and the type of character used in each digit are fixed and that includes error characters;

DETAILED DESCRIPTION OF THE PREFERRED EMBODIMENTS

Exemplary embodiments of a paper-sheet management method and a paper-sheet management system according to the present invention are explained in detail below with reference to the accompanying drawings. A banknote is presented in these embodiments as an example of a paper sheet, and a banknote management system is explained that it performs character recognition of a serial number of the banknote, and in the case of presence of a character that cannot be recognized, allocates an error character to the unrecognizable character before registering it in a database and uses the registered serial number data to manage transaction details of the banknote.

The banknote management system according to the present invention performs character recognition of the serial number of the banknote while taking digit shift into account, and registers digit-shift-corrected serial number in the database. In addition, according to the present invention the banknote management system takes the digit shift into account when searching the database for the serial number data that was registered in the database in the past without taking the digit shift into account. Consequently, not only can digit-shifted serial numbers be prevented from being registered in the database, the database can search for the digit-shifted serial numbers registered in the past by taking the digit shift into account.

Figure 1:
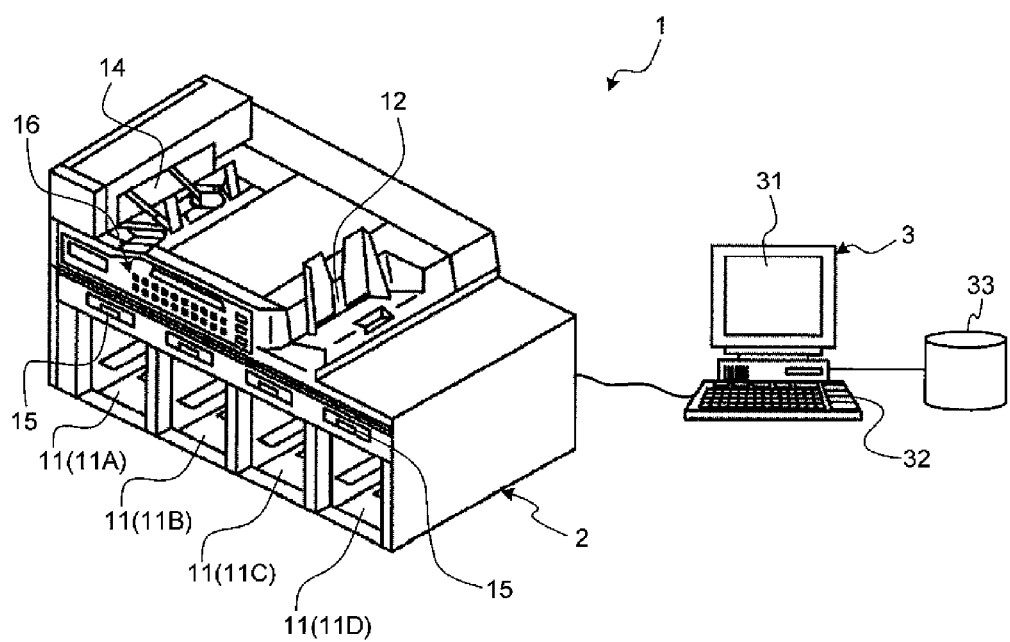
FIG. 1 is an overall schematic diagram of a banknote management system according to an embodiment of the present invention.
Figure 2:
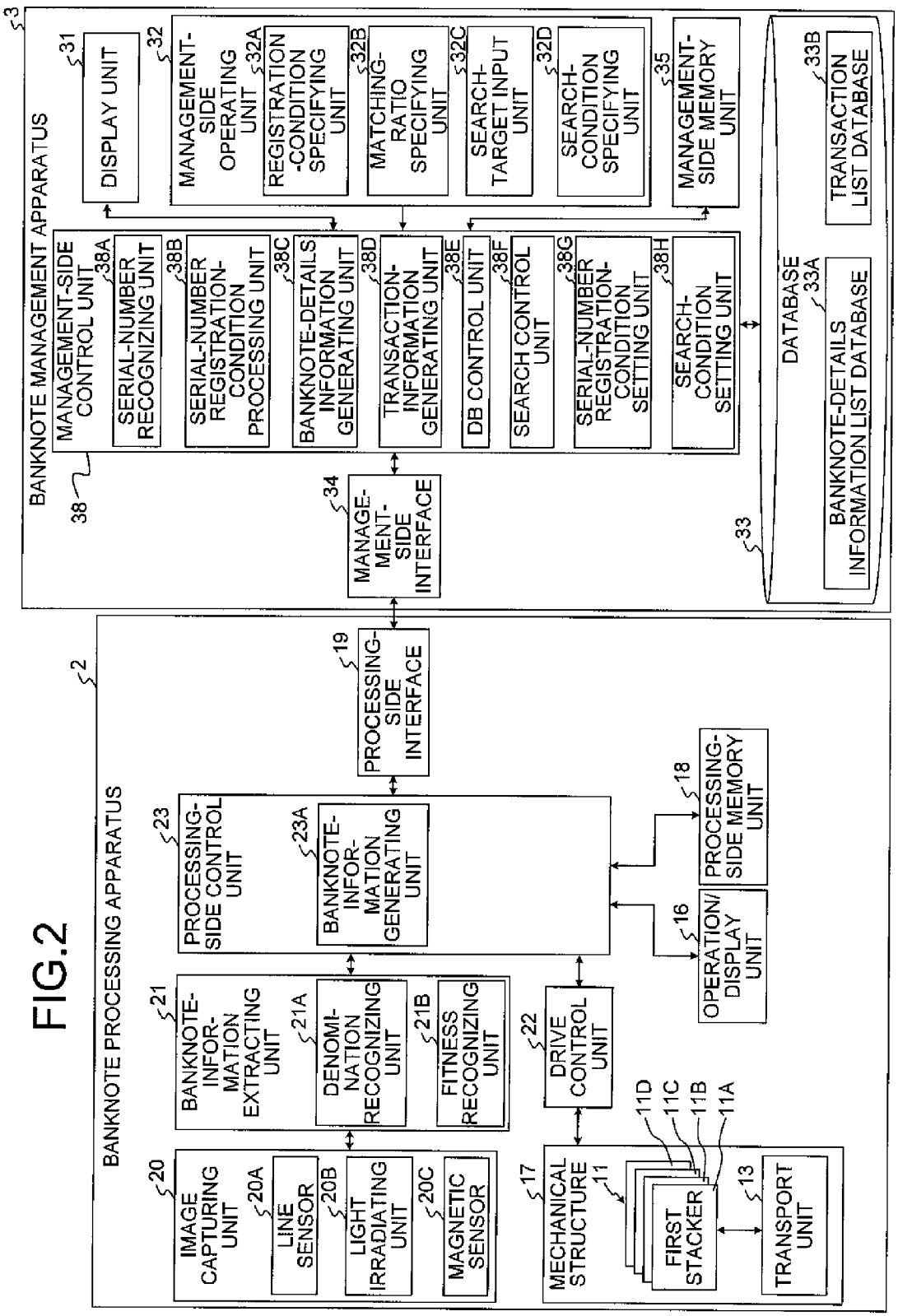
FIG. 2 is a block diagram of the banknote management system shown in FIG. 1.

FIG. 1 is an overall schematic diagram of a banknote management system according to an embodiment of the present invention. FIG. 2 is a block diagram of the banknote management system shown in FIG. 1.

A banknote management system 1 shown in FIG. 1 includes a banknote processing apparatus 2 that generates a paper sheet image and recognizes, sorts, and stacks the banknotes, and a banknote management apparatus 3 that manages the banknote processing apparatus 2.

The banknote processing apparatus 2 includes a banknote depositing unit 12 for depositing the banknotes, a transport unit 13 that transports the banknotes deposited at the banknote depositing unit 12 one by one (see FIG. 2), a plurality of stackers 11 where banknotes transported by the transport unit 13 are sequentially stacked, a rejection unit 14 that rejects those banknotes that do not satisfy sorting conditions for stacking in the stackers 11, a stacker display unit 15 that displays the status of each of the stackers 11, and an operation/display unit 16 that accepts input of and displays various types of information.

The stackers 11 include a first stacker 11A to a fourth stacker 11D. For example, the banknotes that are sorted based on the sorting condition, such as, a denomination, are transported to and stacked in any of the stackers 11A to 11D. The sorting condition can be modified as required by performing specification operations on a banknote management apparatus 3 side.

If the banknote transported by the transport unit 13 meets the stacking condition of the first stacker 11A, the banknote processing apparatus 2 stacks the banknote in the first stacker 11A. Similarly, the banknotes are transported to and stacked in any of the second stacker 11B to the fourth stacker 11D. If the banknote transported by the transport unit 13 does not meet the sorting conditions of any of the stackers 11A to 11D, it is transported to the rejection unit 14.

The banknote management apparatus 3 manages the banknote processing apparatus 2 to which it is connected, and includes a display unit 31 that displays various types of information, a management-side operating unit 32 for inputting various types of information, and a database 33 that registers and manages information pertaining to the banknotes.

As shown in FIG. 2, the banknote processing apparatus 2 includes a mechanical structure 17 that includes the stackers 11 and the transport unit 13, the operation/display unit 16, a processing-side memory unit 18 that stores therein various types of information, and a processing-side interface 19 that serves as a communication interface between the banknote processing apparatus 2 and the banknote management apparatus 3. Furthermore, the banknote processing apparatus 2 includes an image capturing unit 20 that captures images of a face-side and a back-side of the banknote that is transported by the transport unit 13, a banknote-information extracting unit 21 that extracts information pertaining to the banknote from the images captured by the image capturing unit 20, a drive control unit 22 that drive-controls the mechanical structure 17, and a processing-side control unit 23 that performs an overall control of the banknote processing apparatus 2.

The image capturing unit 20 includes a light irradiating unit 20B that irradiates the banknote that is transported by the transport unit 13 with a selected light from among a visible light such as red or green light, an infrared light, and an ultraviolet light, and a line sensor 20A that serves as an image capturing element. The image capturing unit 20 captures the images of the face-side and the back-side of the banknote by having the light irradiating unit 20B to irradiate the banknote that is transported by the transport unit 13 with the selected light and the line sensor 20A to receive a reflected light from the banknote. Furthermore, the image capturing unit 20 also creates a transmission image of the banknote by having the light irradiating unit 20B to irradiate the banknote with the light and the line sensor 20A to receive a transmitted light from the banknote. Furthermore, the image capturing unit 20 includes a magnetic sensor 20C that detects as well as acquires a magnetic field distribution on the face-side and the back-side of the banknote. That is, the image capturing unit 20 acquires as banknote images, the reflected images of the face-side and the back-side of the banknote that is transported by the transport unit 13, the transmission image of the banknote, and the magnetic field distribution of the banknote. Other than the line sensor 20A, a CCD (Charge Coupled Device) camera, and the like, can be used as the image capturing element.

The banknote-information extracting unit 21 includes a denomination recognition unit 21A that recognizes the denomination of the banknote transported by the transport unit 13, and a fitness recognition unit 21B that recognizes whether the banknote is a fit note or an unfit note. The denomination recognition unit 21A recognizes, for example, in the case of Japanese currency, whether the banknote is a 10,000 Yen note, a 5,000 Yen note, a 2,000 Yen note, or a 1,000 Yen note as well as whether it is a new banknote or an old banknote (whether the banknote was printed before the printing reform or after the printing reform), based on the banknote images acquired from the image capturing unit 20. In the case of overseas banknotes, the denomination recognition unit 21A recognizes a version (the generation of banknotes, old or new) other than the denomination. The fitness recognition unit 21B recognizes a fitness result, such as, whether the banknote is fit to be loaded into an ATM of a financial institution (hereinafter, "ATM-fit note"), used in transactions at the teller window (hereinafter, "teller-fit note"), or not fit for circulation (hereinafter, "unfit note"), based on the banknote images acquired from the image capturing unit 20. The ATM-fit note, for example, is crisper and has less stain than the teller-fit note, and can transit smoothly inside the ATM.

The processing-side control unit 23 includes a banknote-information generating unit 23A that generates banknote information. The banknote-information generating unit 23A generates the banknote information that includes the banknote images acquired from the image capturing unit 20, the denomination recognition result of the denomination recognition unit 21A, the fitness result of the fitness recognition unit 21B, and a transaction ID that identifies a transaction pertaining to the banknote.

The banknote management apparatus 3 includes the display unit 31 that displays various types of information, the management-side operating unit 32 for performing input operations of various types of information, a management-side control unit 38 that performs various types of control upon operation of the management-side operating unit 32, the database 33 that includes a database of serial numbers, a management-side interface 34 for communication between the banknote management apparatus 3 and the banknote processing apparatus 2, and a management-side memory unit 35 that stores therein various types of information.

The management-side operating unit 32 of the banknote management apparatus 3 includes a registration-condition specifying unit 32A that specifies a registration condition of the serial number data, a matching ratio specifying unit 32B that specifies a matching ratio when searching the serial number data, a search-target input unit 32C for inputting the serial number to be searched, a search-condition specifying unit 32D that specifies search condition, etc.

Figure 3:
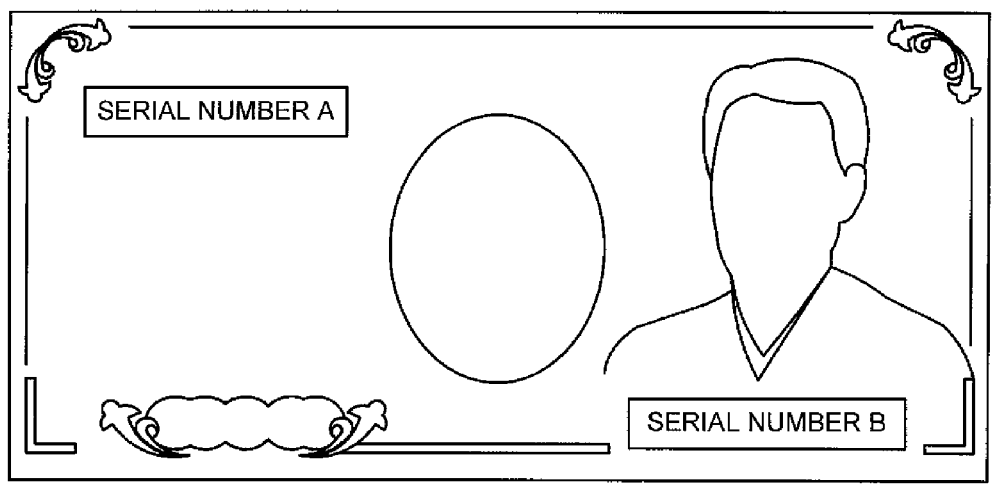
FIG. 3 is a drawing for explaining a positional relation of serial numbers printed on a typical banknote.

FIG. 3 is a drawing for explaining the serial number of the banknote. A multi-digit serial number identifying the banknote is generally printed on the banknote; however, the number of digits of the serial number, the type of characters used in the serial numbers, the location where the serial number is printed on the banknote, etc., vary according to the country in which the banknote is issued, the denomination of the banknote, etc. In the following explanation, a case in which a serial number A is placed on the upper left of the banknote and a serial number B is placed on the lower right of the banknote is taken as an example, as shown in FIG. 3.

The management-side control unit 38 of the banknote management apparatus 3 shown in FIG. 2 includes a serial-number recognition unit 38A that performs character recognition of the serial number using the banknote images in the banknote information received from the banknote processing apparatus 2, and a serial-number registration-condition processing unit 38B that judges whether the serial number data recognized by the serial-number recognition unit 38A satisfies a predetermined registration condition.

The serial-number recognition unit 38A extracts serial number areas that include the serial numbers from the banknote images included in the banknote information, and performs character recognition of the serial number A and the serial number B from the extracted serial number areas using OCR, and the like. During this operation, if a character in the digits composing the serial is not recognized to be either a Roman alphabetic character or a numeric character, the serial-number recognition unit 38A allocates to that digit a predetermined character, such as, "?" as an error character, indicating that the character in that digit is unrecognizable.

The serial-number registration-condition processing unit 38B judges whether the serial number data recognized by the serial-number recognition unit 38A satisfies the determined registration condition. Some examples of the conditions that can be set are that the character of a specific digit that is essential in the subsequent matching (hereinafter, "specific essential digit for matching") be recognized, or that the total number of error characters be lower than or equal to a predetermined value, or that the matching ratio that indicates the ratio of matches of the same digits recognized in the serial number A and the serial number B exceeds a predetermined value, or that the serial number data not be included in a counterfeit note list. The matching ratio is explained in detail later.

The banknote management apparatus 3 further includes a banknote-details information generating unit 38C that generates banknote details information based on the serial number data and the banknote information if the serial number data is judged to satisfy the predetermined registration condition by the serial-number registration-condition processing unit 38B, and a transaction-information generating unit 38D that generates transaction information pertaining to the transaction of the banknote.

The serial number data used in the above description is a result of character recognition performed by the serial-number recognition unit 38A; however, the serial number manually entered using an input unit, such as, a not shown keyboard, can be used as the serial number data. For example, if the number of error characters exceeds the predetermined value, the banknote image can be displayed on the display unit 31 of the banknote management apparatus 3, and the serial number entered using the management-side operating unit 32 by a user upon visual recognition of the serial number from the banknote image displayed on the display unit 31 can be used as the serial number data.

The banknote-details information generating unit 38C generates the banknote details information based on the banknote information received from the banknote processing apparatus 2 and the serial number data recognized by the serial-number recognition unit 38A. The banknote details information includes a banknote management number for performing management of the banknote, the serial number, the denomination recognition result, the version, the fitness recognition result, information pertaining to the stacker 11 in which the banknote is sorted and stacked, a transaction information ID, the banknote images, etc.

The transaction-information generating unit 38D generates the transaction information pertaining to a transaction information ID included in the banknote details information. The transaction information includes the transaction information ID, a transaction start time and a transaction end time of the banknote, a user ID that distinguishes the user of the banknote management apparatus 3, that is, the bank official operating the banknote management apparatus 3, a customer ID that distinguishes a customer, that is, the transactional partner, a window/ATM No. that distinguishes the window or the ATM where the transaction takes place, a location code that distinguishes the location, etc.

The management-side control unit 38 includes a database control unit (hereinafter, "DB control unit") 38E that controls registration of data in the database 33, and a search control unit 38F that searches the database 33 for the banknote details information pertaining to the serial number entered via the search-target input unit 32C.

The DB control unit 38E registers the banknote details information and the transaction information in the database 33. In the database 33, the banknote details information is stored in a banknote-details information list database 33A and the transaction information is stored in a transaction list database 33B.

The search control unit 38F searches the database 33 for the banknote details information pertaining to the serial number entered via the search-target input unit 32C, based on the search condition specified by the search-condition specifying unit 32D, and displays a search result on the display unit 31. The management-side control unit 38 can also create a print output of the search result.

The management-side control unit 38 includes a serial-number registration-condition setting unit 38G that sets the serial number registration condition setting specified by the registration-condition specifying unit 32A, and a search-condition setting unit 38H that sets the search condition specified by the search-condition specifying unit 32D.

The serial-number registration-condition setting unit 38G registers the various registration conditions specified by the registration-condition specifying unit 32A in the management-side memory unit 35. The registration condition is used by the serial-number registration-condition processing unit 38B.

The search-condition setting unit 38H sets the search conditions based on the various search conditions specified by the search-condition specifying unit 32D. Some examples of the search condition that can be specified are the number of error characters included in the serial number data, or the character of a specific digit of the serial number data.

Figure 4:
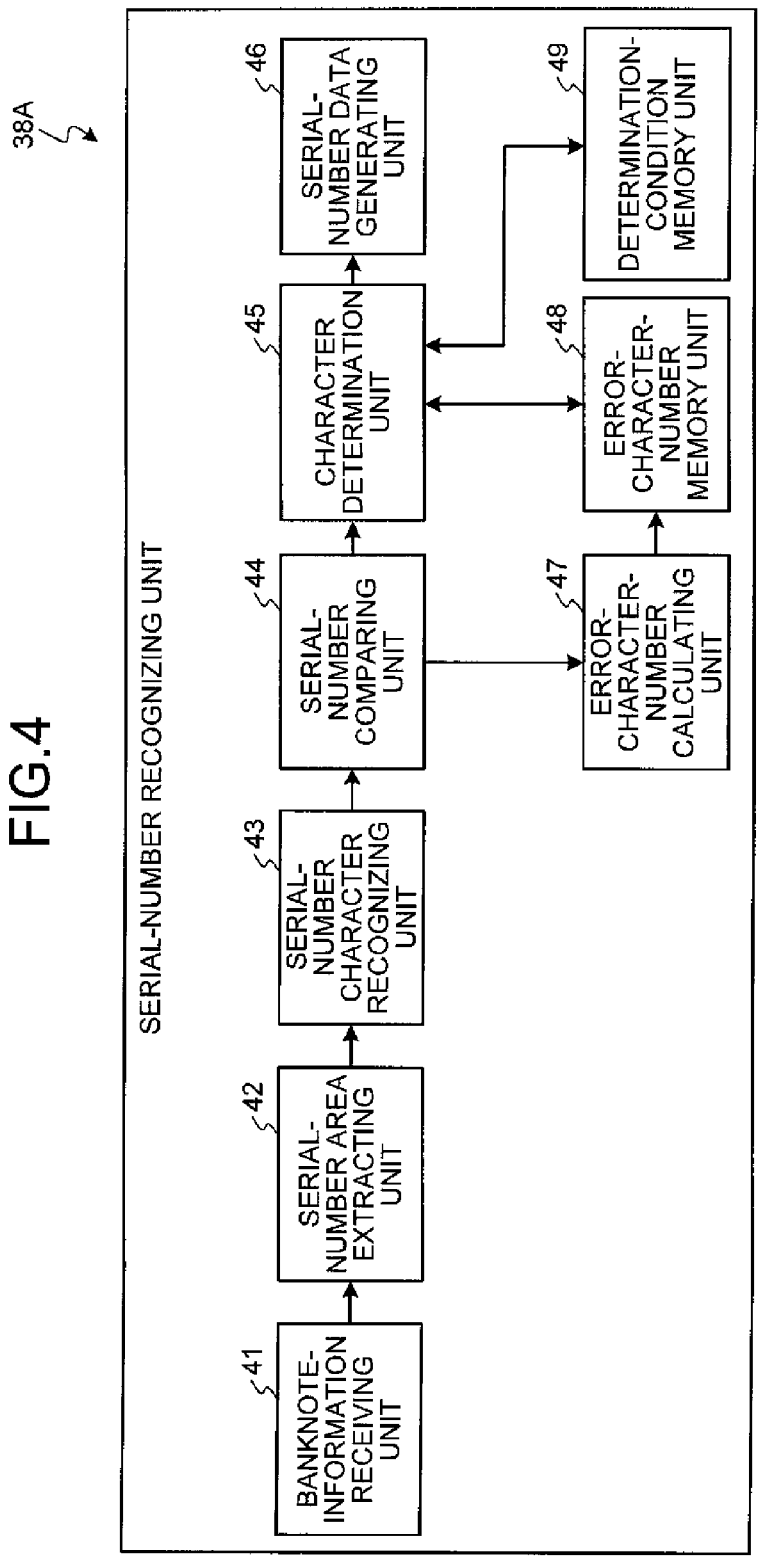
FIG. 4 is a block diagram of a serial-number recognition unit of a management-side control unit on a banknote management apparatus.

FIG. 4 is a block diagram of the serial-number recognition unit 38A of the banknote management apparatus 3. The serial-number recognition unit 38A includes a banknote-information receiving unit 41 that receives the banknote information from the banknote processing apparatus 2 via the management-side interface 34, and a serial-number area extracting unit 42 that extracts the two serial number areas which include the serial number A and the serial number B from the banknote image included in the banknote information received by the banknote-information receiving unit 41. The serial-number recognition unit 38A further includes a serial-number character recognition unit 43 that performs character recognition of the serial number A and the serial number B in the serial number areas extracted by the serial-number area extracting unit 42, and a serial-number comparing unit 44 that verifies the character recognition results of the serial number A with the serial number B by the serial-number character recognition unit 43. The serial-number recognition unit 38A further includes a character determination unit 45 that compares the two character recognition results obtained from the serial number comparing unit 44 digit by digit, and determines the character corresponding to each digit of the serial number based on the matching result, and a serial-number data generating unit 46 that generates the serial number data in which the character corresponding to each digit is determined by the character determination unit 45.

The serial-number recognition unit 38A further includes an error-character-number calculating unit 47 that calculates the number of error characters included in the character recognition result, an error-character-number memory unit 48 that stores therein the number of error characters in the serial number A and the serial number B calculated by the error-character-number calculating unit 47, and an determination-condition memory unit 49 that stores therein a priority order, etc., of the serial numbers.

The priority order of the serial numbers of the banknotes is stored in the determination-condition memory unit 49. For example, a higher priority order can be set for the serial number A and a lower priority order can be set for the serial number B. The user can perform a specification operation to change the setting of the priority order.

The serial-number character recognition unit 43 performs character recognition of the serial number from the serial number area digit by digit. If a character is recognized successfully, the serial-number character recognition unit 43 places the recognized character in the same digit, and if a character could not be recognized, the serial-number character recognition unit 43 allocates the predetermined character that indicates an error character to the concerned digit. The character that is used to represent the error character is not particularly limited; in the following explanation, "?" is used as the error character. The serial-number character recognition unit 43 acquires the character recognition results of each of the digits of both the serial number A and the serial number B.

The serial-number comparing unit 44 performs the matching operating by comparing the character recognition result of the serial number A and the character recognition result of the serial number B digit by digit. The serial-number comparing unit 44 matches the character strings of the serial number A and those of the serial number B recognized by the serial-number character recognition unit 43 character by character starting from the first character, and outputs the match result to the character determination unit 45.

The character determination unit 45 determines the character corresponding to each digit based on the match result obtained from the serial-number comparing unit 44. If the matching ratio, which indicates a ratio of the number of digits of the serial number to the number of characters corresponding to the digits of the serial number A and the serial number B that match, is higher than or equal to the predetermined value, the character determination unit 45 performs the process of determining the character of each of the digits. On the other hand, if the matching ratio is lower than the predetermined value, the character determination unit 45 judges that there exists a digit shift in either the serial number A or the serial number B, and performs a process for correcting the digit shift. A predetermined value set beforehand as to the matching ratio can be used. The matching ratio can be set to an arbitrary value with the matching ratio specifying unit 32B.

The process pertaining to the digit shift is explained in detail later. The process performed by the character determination unit 45 when the matching ratio is higher than or equal to the predetermined value, that is, when there is no digit shift, is explained below.

If the characters corresponding to a particular digit of the serial number A and the serial number B match, and the characters are not the error character, the character determination unit 45 determines the character for the corresponding digit. Specifically, if the character corresponding to the third digit of the serial number A is "3", and the character corresponding to the third digit of the serial number B is also, "3", the character determination unit 45 determines the character corresponding to the third digit to be "3".

If the error character is found in a particular digit in both the serial number A and the serial number B, the character determination unit 45 determines the character corresponding to the digit to be the error character "?". Specifically, the character corresponding to the fourth digit of the serial number A is "?", and the character corresponding to the fourth digit of the serial number B is also "?", the character determination unit 45 determines the character corresponding to the fourth digit to be "?".

If the character corresponding to a particular digit of either the serial number A or the serial number B is recognized, but the character corresponding to the same digit in the other serial number B or A is the error character, the character determination unit 45 determines the recognized character as the character corresponding to the digit. Specifically, if the character corresponding to the seventh digit of the serial number A is "?", and the character corresponding to the seventh digit of the serial number B is "7", the character determination unit 45 determines the character of the seventh digit to be "7".

If the characters corresponding to the same digit of the serial number A and the serial number B are different but not the error character, the character determination unit determines the characters of the digit based on a determination-condition.

As an example of the determination-condition, the character determination unit 45 can give a higher priority to the recognition result of the serial number with fewer number of error characters, based on the number of error characters stored in the error-character-number memory unit 48. For example, if character recognition of the area corresponding to the serial number A is not performed properly due to stains or scribbling, the number of error characters of the serial number A would be greater than that of the serial number B. In this case, the character determination unit 45 gives a higher priority to the recognition result of the serial number B due to the number of error characters included in the serial number A, and determines the character of the digit with differing characters in the serial number A and the serial number B to be the character recognized in the serial number B.

As another example of the determination-condition, the character determination unit 45 can determine the character recognition result of a digit of the serial number is correct when the priority of the serial numbers are stored in the determination-condition memory unit 49 and higher priority is given to the serial number. For example, if the character recognition of the serial number A is likely to be more accurate compared with that of the serial number B due to the presence of the background design or color in the area corresponding to the serial number B, the recognition result of the serial number A is set to have a higher priority. In this case, because the serial number A stored in the determination-condition memory unit 49 is set to have a higher priority, the character determination unit 45 gives priority to the recognition result of the serial number A, and determines the character of the digit with differing characters in the serial number A and the serial number B to be the character recognized in the serial number A. The character that is recognized as a Roman alphabetic character or a numeric character, and not as an error character, shall hereafter be referred to as "affirmed character".

Figure 5:
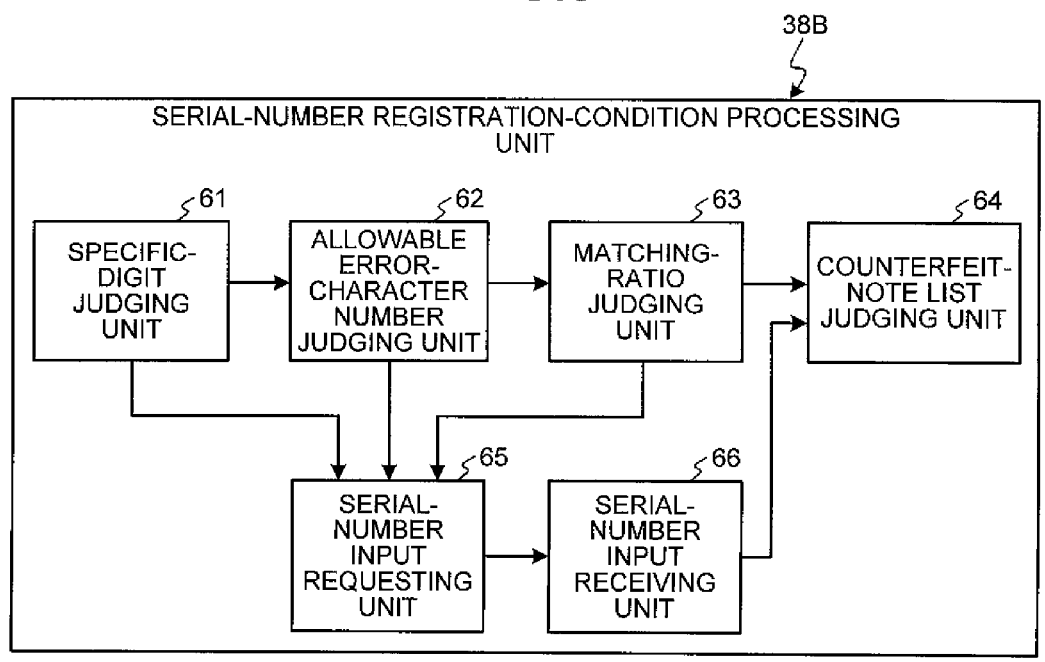
FIG. 5 is a block diagram of a serial-number registration-condition processing unit of the management-side control unit on the banknote management apparatus side.

FIG. 5 is a block diagram showing a schematic configuration of the serial-number registration-condition processing unit 38B on the banknote management apparatus 3 side. The serial-number registration-condition processing unit 38B includes a specific-digit judging unit 61 that judges whether the specific essential digit for matching of the serial number data acquired from the serial-number character recognition unit 38A is an affirmed character, and an allowable error-character number judging unit 62 that judges whether the number of error characters in the serial number data is within an allowable number of error characters.

When the serial number data is acquired from the serial-number data generating unit 46 of the serial-number recognition unit 38A, the specific-digit judging unit 61 judges whether the character corresponding to the specific essential digit for matching is a predetermined affirmed character in the serial number data specified by the registration-condition specifying unit 32A.

Specifically, for example, the first digit and the tenth digit of the serial number are significant and if these digits have an error character in them, the serial number data cannot be registered with the error characters in these significant digits, and needs to be corrected by performing character recognition once again or by manual entry. In that case, these digits are specified by the registration-condition specifying unit 32A as the specific essential digits for matching. The specific-digit judging unit 61 refers to the first digit and the tenth digit of the serial number data to judge whether both the digits have the affirmed character in them or whether either of these digits has the error character in it.

If the specific essential digit for matching has the affirmed character in it, the allowable error-character number judging unit 62 judges whether the number of error characters in the serial number data is within the allowable number of error characters specified by the registration-condition specifying unit 32A.

The serial-number registration-condition processing unit 38B further includes a matching ratio judging unit 63. If it is judged by the allowable error-character number judging unit 62 that the number of error characters in the serial number data is within the allowable number of error characters, the matching ratio judging unit 63 judges whether the matching ratio of the character recognition results of the serial number A to those of the serial number B is higher than a matching ratio essential for matching specified by the matching ratio specifying unit 32B.

The matching ratio is obtained by comparing the character recognition results of the serial number A and the serial number B and calculating the ratio of digits that match, excluding those digits that have the error character. Specifically, the character recognition result of the serial number A is "123456?890" and the character recognition result of the serial number B is "1?3?5676?0". If the error characters are disregarded and the number of digits that have matching affirmed characters in the two character recognition results is assumed to be X, in the current example X=5; because, the affirmed characters in the first digit, third digit, fifth digit, sixth digit and tenth digit are respectively coincident. Next, if the number of digits that have affirmed characters but that do not match is assumed to be Z, in the current example Z=1; because, the affirmed characters in the eighth digit in the character recognition results do not match. The matching ratio is calculated based on these results X and Z using the formula X/(X+Z). In this current example, the matching ratio will be 83.3%.

The serial-number registration-condition processing unit 38B further includes a counterfeit-note list judging unit 64. If it is judged by the matching ratio judging unit 63 that the matching ratio is higher than the predetermined matching ratio essential for matching, the counterfeit-note list judging unit 64 judges whether the serial number data corresponds to a serial number of the counterfeit notes listed in the counterfeit note list.

If the serial number data does not correspond to any serial number of the counterfeit notes listed in the counterfeit note list, the counterfeit-note list judging unit 64 judges that the serial number data satisfies all the predetermined registration conditions and sends the serial number data to the banknote-details information generating unit 38C.

Furthermore, the serial number data that is sent to the banknote-details information generating unit 38C is not limited to that in which the characters of the serial number are all affirmed characters. If all the conditions, namely, the specific essential digit for matching of the serial number data has an affirmed character, the number of error characters in the serial number data is within the allowable number of error characters, the matching ratio of the character recognition results is higher than the matching ratio essential for matching, and the serial number data does not correspond to a serial number of the counterfeit notes listed in the counterfeit note list are satisfied, the serial number data is sent to the banknote-details information generating unit 38C even if the serial number includes an error character.

The banknote-details information generating unit 38C generates the banknote details information based on the serial number data (or an input serial number) of the banknote and the banknote information, and registers the banknote details information in the database 33 through the DB control unit 38E.

If the serial number data of the banknote is judged by the counterfeit-note list judging unit 64 to correspond to a serial number of a counterfeit note listed in the counterfeit note list, the management-side control unit 38 displays a counterfeit note detection alert on the display unit 31 and the operation/display unit 16 without registering the banknote details information of the banknote in the database 33. The user can recognize from the alert display that a counterfeit note has been detected.

The serial-number registration-condition processing unit 38B further includes a serial-number input requesting unit 65 and a serial-number input receiving unit 66. If the specific essential digit for matching of the serial number data is judged by the specific-digit judging unit 61 not to have the affirmed character, or the number of error characters in the serial number data is judged by the allowable error-character number judging unit 62 to be greater than the allowable number of error characters, or the matching ratio is judged by the matching ratio judging unit 63 not to satisfy the matching ratio essential for matching, or the serial number data is judged by the counterfeit-note list judging unit 64 to correspond to a serial number of a counterfeit note listed in the counterfeit note list, the serial number data is not sent from the serial-number recognition unit 38A to the banknote-details information generating unit 38C; instead, the serial-number input requesting unit 65 requests an input operation of the serial number. The serial-number input receiving unit 66 receives the input serial number when the input operation of the serial number is performed. The serial-number input requesting unit 65 and the serial-number input receiving unit 66 are functional units for receiving the serial number input by the user while visually confirming the banknote image in the case where the serial number data acquired after character recognition does not satisfy predetermined conditions.

The serial-number input requesting unit 65 displays a serial number input screen on the display unit 31, prompting the user to manually input the serial number. During manual input of the serial number by the user, the serial number data that failed to satisfy the serial number registration condition and the banknote image from which the serial number data was read are displayed on the display unit 31.

The serial-number input receiving unit 66 receives the serial number manually input by the user while visually confirming the banknote image. Once the serial number is input, the counterfeit-note list judging unit 64 judges whether the serial number corresponds to a serial number of the counterfeit note listed in the counterfeit notes list. If the serial number is judged by the counterfeit-note list judging unit 64 not to correspond to any serial number of the counterfeit notes listed in the counterfeit notes list, the banknote-details information generating unit 38C generates the banknote details information based on the input serial number and the banknote information and registers the banknote details information in the database 33 through the DB control unit 38E. If the serial number is judged to correspond to a serial number of a counterfeit note, as mentioned above, the counterfeit note detection alert is displayed on the display unit 31 and the operation/display unit 16, and the banknote details information of the banknote is not registered in the database 33.

The search control unit 38F has a function of referring to the data registered in the database 33 by the functions and actions of the components mentioned above and searching the serial number data. Based on the search condition set by the search-condition setting unit 38H, the search control unit 38F searches the serial number data included in the banknote details information registered in the database 33 for the serial number data that matches or that can possibly match, and displays the search result on the display unit 31. The banknote details information displayed as the search result includes, for example, the serial number data, the denomination recognition result, the version, a fitness recognition result, a sorting condition, transaction information, and the banknote image. The transaction information ID, the transaction start time, the transaction end time, the user ID, the customer ID, teller/ATM No. a location code, etc., are displayed as transaction information.

One of the features of the present invention is that the banknote management system that includes the banknote processing apparatus 2 and the banknote management apparatus 3 can perform serial number registration and serial number search while taking the digit shift into account.

A process performed when registering the serial number data in the database 33 with regard to the process performed pertaining to the digit shift is explained in detail with reference to FIGS. 6 to 8. The process performed for registering the serial number data is, specifically, a process performed for determining the serial number by comparing the two serial number recognition results after two serial numbers on one banknote are recognized by the serial-number recognition unit 38A.

Figure 6:
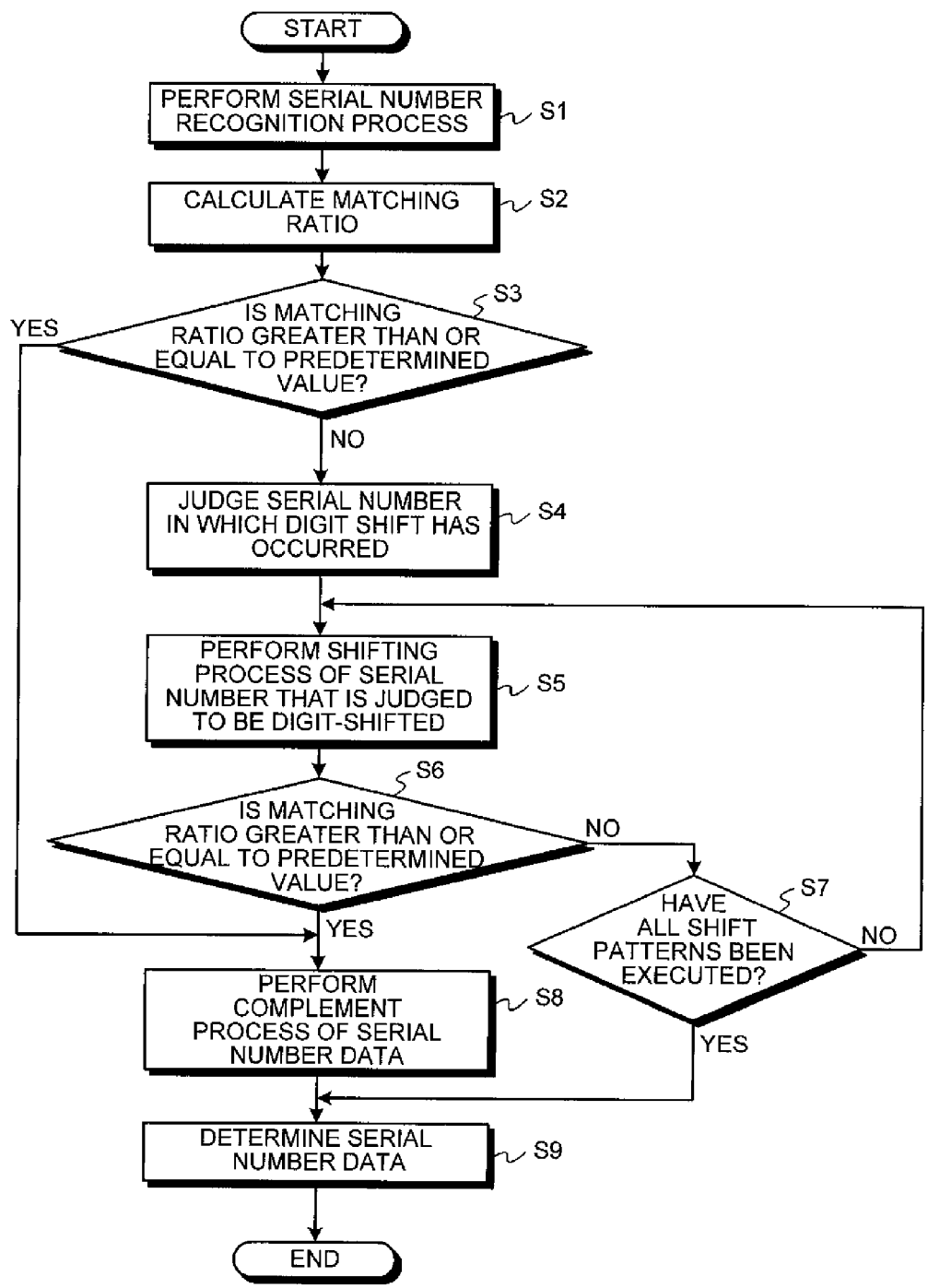
FIG. 6 is a flowchart of a processing operation pertaining to a serial number recognition process performed inside the management-side control unit on the banknote management apparatus side.

FIG. 6 is a flowchart of a process of determining the character of each digit of the serial number data obtained upon character recognition from the banknote image, while taking the digit shift into account. Once a character recognition process of each digit composing the serial number is completed by the serial-number character recognition unit 43, two pieces of serial number data corresponding to the serial number data A and the serial number data B that are at different areas are obtained, as shown in FIG. 3 (Step S1).

Upon obtaining two pieces of serial number data, the serial number data A and the serial number data B, the serial-number comparing unit 44 performs matching of the serial number data A and the serial number data B. The character determination unit 45 calculates the matching ratio based on the matching result (Step S2).

The subsequent process is performed by the character determination unit 45. In the following explanation, the serial number data that is character-recognized as the serial number A shall be referred to as "serial number A" and the serial number data that is character-recognized as the serial number B shall be referred to as "serial number B". The serial number A and the serial number B are the same serial number when they are printed on the same banknote; however, to differentiate from the character-recognized serial number data, the actual serial number printed on the banknote shall be referred to as "banknote serial number" in the following explanation.

Whether the matching ratio is higher than or equal to the predetermined value is judged (Step S3). If the matching ratio is higher than or equal to the predetermined value (Yes at Step S3), as explained above, a complement process is performed for determining the serial number based on the priority order, etc., of the serial number area (Step S8), and the serial number data is determined (Step S9). On the other hand, if the matching ratio is lower than the predetermined value (No at Step S3), a process is started to judge whether a digit shift has occurred is commenced.

It is first judged as to whether a digit shift has occurred in the serial number A or the serial number B (Step S4). It is explained later how the serial number in which the digit shift has occurred is judged; however, It is assumed that the digit shift has occurred in the serial number B in this explanation.

If it is judged that the digit shift has occurred in the serial number B, a shifting process is performed to correct the digit shift of the characters corresponding to respective digits composing the serial number B (Step S5).

FIG. 7 shows a case in which serial number A is data acquired by recognizing characters of the serial number on a banknote correctly and serial number B is the data, acquired by recognizing characters of the banknote serial number, of which characters are shifted right one digit. That is, the example shown is that of the banknote serial number being "AB123456C". If the banknote has a stain before the first character "A" in the area corresponding to the serial number B, the stain can be misrecognized to be a character. However, even though the stain is misrecognized to be a character, due to the inability to recognize the stain to be a Roman alphabetic character or a numeric character, the error character is allocated to the digit. The result of this character recognition is shown as the serial number B "?AB??3456C" in FIG. 7.

In FIG. 7, a comparison result with each digit of the serial number A and the serial number B is shown below each digit of the serial number B. In the comparison result, "Y" represents a case where neither of the characters in that digit of the serial number A and the serial number B is the error character, and the characters match, and "N" represents a case where neither of the characters in that digit of the serial number A and the serial number B is the error character, but the characters do not match. A bar symbol represents a case where the character in that digit in at least one of the serial number A and the serial number B is the error character, and therefore, a match cannot be judged.

As shown in FIG. 7, no digit has a matching recognition result between the serial number A that is obtained by correctly character-recognizing the banknote serial number and the serial number B that is obtained by character-recognizing the banknote serial number with shift of a single digit. Therefore, the matching ratio is 0%. However, as shown in the bottommost drawing of FIG. 7, if the serial number B is shifted left one digit, and the error characters are excluded, 100% matching ratio can be seen between all the recognized characters of the serial number A and the shifted serial number B.

A direction in which the character of each digit composing the serial number data is shifted and the number of digits to be shifted are stored as a shift pattern in the determination-condition memory unit 49. The shift patterns can be a combination of various conditions with regard to the direction of the digit shift and the number of digits to be shifted to the direction.

Specifically, a shift pattern can be set in a manner where regardless of the content of the serial number data, the serial number data is to be shifted left one digit and right up to three digits for estimation. In this shift pattern, the serial number data is shifted left one digit up to three digits, the matching ratio is checked after each shift. After the digit shift in the left direction is completed, the serial number data is reset to the initial state, and shifted right from one digit up to three digits. The process is then ended.

The settings of the shift pattern can be modified by the management-side operating unit 32. Preset shift patterns can be used, or alternatively, automatic modification of the preset shift pattern can be selected based on the content of the serial number data judged to have been shifted. For example, as shown in FIG. 7, if an error character is allocated in the most left digit of the serial number data, because the possibility is high that this portion is stained, the shift pattern is set that the serial number data is shifted left from one to three digits. In the shift pattern, only leftward shifting can be set to be performed; alternatively, a rightward shift following the leftward shift can be set to be performed, if the matching ratio that is higher than or equal to the predetermined value is not obtained by the leftward shift. By modifying the shift pattern dynamically based on the recognition result of the serial number data, a preferential shifting process in which the possibility of correcting the digit shift is high is performed, and the serial number data whose digit shift is corrected can be obtained in a short time.

After the shifting process performed based on the shift pattern (Step S5 of FIG. 6), if the matching ratio is lower than the predetermined value (No at Step S6), the shifting process of the serial number B (Step S5) is continued until all the shift patterns are executed (No at Step S7). If the matching ratio is lower than the predetermined value even after all the shift patterns have been executed (Yes at Step S7), the processes pertaining to the digit shift are ended, and the serial number data is determined as it was character-recognized by the serial-number character recognition unit 43, without any shift of the characters (Step S9).

Thereafter, the process by the serial-number registration-condition processing unit 38B is continued as explained with reference to FIG. 5. If the matching ratio is lower than the predetermined value, visual recognition and manual input of the serial number is performed by the user using the serial-number input requesting unit 65 and the serial-number input receiving unit 66.

In the present embodiment, the matching ratio is checked after each shift of one digit according to the shift pattern, and when the matching ratio is found to be higher than or equal to the predetermined value, the shifting process is ended. An ending condition of the shifting process need not be limited to this; a variation rate of the matching ratio can be the ending condition. When there is a digit shift, the matching ratio varies significantly by the correction of the digit shift explained above. Based on the variation in the matching ratio, if the matching ratio, for example, tends to be higher than or equal to a predetermined range, the digit shift can be judged to have been corrected, and the shifting process can be ended.

Alternatively, without ending the shifting process based on the value of the matching ratio, all the shifting processes included in the shift patterns can be performed, regardless of the matching ratio. After all the shifting processes included in the shift patterns are performed, the complement process can be performed using the serial number B that is obtained after the shift in which the maximum matching ratio is attained.

If the matching ratio is higher than or equal to the predetermined value (Yes at Step S6) as a result of the shifting process (see Step S5 of FIG. 6), the complement process on the serial number is performed (Step S8). FIG. 8 is a drawing for explaining the complement process. As in FIG. 7, the banknote serial number in FIG. 8 is "AB123456C". As shown in FIG. 8, immediately after character recognition, the second digit in the serial number A, and the first, fourth, and fifth digits in the serial number B are error characters. The matching ratio of the serial number A and the serial number B is 0%. However, as shown in FIG. 8, after the serial number B is shifted left one digit, a matching ratio of 85.7% is attained. If the matching ratio is higher than or equal to the predetermined value, the complement process of the serial number is performed (Step S8).

Specifically, when the serial number A and the shifted serial number B are compared, if a digit in the serial number A or the serial number B has the error character due to unsuccessful character recognition, and the same digit in the serial number B or the serial number A has a recognized character, the error character is complemented with the recognized character. In FIG. 8, the second digit of the serial number A has the error character but the same digit in the shifted serial number B has "B" as the recognized character; therefore, the second digit is determined to be "B". Similarly, the third and fourth digits of the shifted serial number B have the error characters, but the same digits of the serial number A are recognized as "1" and "2", respectively; therefore, the third and fourth digits are determined to be "1" and "2", respectively. Consequently, the serial number data is determined to be "AB123456C" with the characters corresponding to all the digits recognized (Step S9 of FIG. 6).

Thus, even in the case where the matching ratio is low immediately after character recognition and visual confirmation and manual input is required, the process that takes the digit shift into account is performed. Consequently, the digit shift is automatically corrected and the serial number is accurately recognized. Furthermore, even if the error characters are included in the serial number A and the serial number B due to unsuccessful character recognition, the characters can be determined by the complement process. Consequently, a recognition rate of the character recognition can be increased.

Once the process of correction of the digit shift and the complement process are completed, and the serial number data is determined (Step S9), the process by the serial-number registration-condition processing unit 38B is continued as explained with reference to FIG. 5, and the banknote details information that includes the serial number data is registered in the database 33. The serial number data registered in the database 33 is digit-shift-corrected data; therefore, when the database 33 is searched later for the serial number, it can be avoided that the digit-shifted serial number was registered and the registered serial number, in spite of being a matching serial number for the search, is regarded as a different serial number. That is, the serial number data is stored in the database as a valid data that is usable anytime in the future.

In the above explanation, an example is shown where the shift of one digit has occurred in the right direction. As shown in FIG. 9, similar process is performed for correction of the digit shift and the complement process is performed on the character recognition result even if there is a shift of two or more digits or if there is a digit shift in the left direction.

FIG. 9 is a drawing showing a case in which the serial number A represents correctly character-recognized banknote serial number and a serial number B1 represents the banknote serial number that is shifted right two digits during character recognition. In this case, if the shifting process is performed according to the set shift pattern, when the serial number data is shifted left two digits, the shifted serial number B1 and the serial number A match, and the matching ratio goes up from 0% to 100%. FIG. 9 also shows a case in which a serial number B2 represents the same banknote serial number that is shifted left one digit during character recognition. In this case, too, if the shift process is performed in which the serial number data is shifted right one digit, the matching ratio of shifted serial number B2 and the serial number A goes up from 20% to 100%.

Thus, by the above method, valid digit-shift-corrected serial number data can be obtained without human intervention, regardless of the direction of the digit shift or the number of shifted digits. Registering the digit-shift-corrected serial number data in the database 33 enables the serial number to be correctly retrieved when searched at a later date.

A case in which the number of digits of the serial number and the type of the character corresponding to each of the digits is fixed is explained next. FIGS. 7 to 9 are drawings showing cases in which the number of digits of the serial number and the type of the character corresponding to each of the digits are not fixed. However, according to the country in which the banknote is issued or the denomination of the banknote, there are cases, for example, in the banknotes of the United States, where the number of digits of the serial number and the type of characters used in each digit are fixed beforehand. The process pertaining to the case in which the number of digits of the serial number and the type of character used in each digit are fixed is explained next with reference to FIGS. 10 and 11. The number of digits of the serial number is fixed as 11, and of the 11 digits, the first digit, second digit, and eleventh digit are Roman alphabetic characters, and the remaining digits are all numeric characters.

The process flow of determination of the serial number while taking into account the digit shift is similar to the process explained with reference to FIG. 6, and is therefore explained in this case with reference to FIG. 6. As shown in FIG. 10, when character recognition is performed on the serial number A and the serial number B (Step 1 of FIG. 6), the matching ratio is 12.5% (Step S2). If the matching ratio is lower than the predetermined value (No at Step S3), whether a digit shift has occurred is judged.

If the serial number A and the serial number B obtained by performing character recognition of the same banknote serial number differ, it is judged as to whether a digit shift has occurred in the serial number A or the serial number B (Step S4). Based on the composition of the serial number in which the first, second, and eleventh digits are Roman alphabetic characters and the rest of the digits are numeric characters, in the example shown in FIG. 10, the serial number A is judged to be character-recognized without any digit shift. That is, the subsequent process is continued with the judgment that a digit shift has occurred in the serial number B.

As regards the direction of the digit shift and the number of shifted digits, as shown in FIG. 10, because the second digit is recognized to be a Roman alphabetic character and the character in the eleventh digit is not recognized as a Roman alphabetic character and hence is the error character, the serial number B is judged to have been shifted right one digit. A method of judging the digit shift is explained in detail later.

Once the serial number in which the digit shift has occurred is judged to be the serial number B, the subsequence processes (Steps S5 to S9 of FIG. 6) are similar to those explained with reference to FIGS. 7 to 9. As shown in FIG. 10, the serial number B is shifted left one digit and a matching ratio of 100% is attained (Yes at Step S6). The complement process is performed on the error characters in the digit-shifted serial number data (Step S8), and the serial number data is determined to be "IL19508854A" (Step S9).

Similarly, even if the serial number A and the serial number B as shown in FIG. 11 are obtained as a result of character recognition, based on a composition condition of the serial number and the content of each of the digits composing the serial number data, the serial number B is judged to have been shifted left one digit. Therefore, the serial number B is shifted right one digit, and the characters of all the digits of the serial number data can be determined by the complement process. If the serial number in which the digit shift has occurred can be identified, even if the serial number data is shifted two or more digits to right or left, the digits can be shifted as explained above and the serial number can be determined.

Thus, when the number of digits and the type of characters used in each of the digits is fixed, the serial number in which the digit shift has occurred, the direction of the digit shift, and number of shifted digits can be easily judged. Thus, even in the case where the matching ratio is low immediately after character recognition requiring visual confirmation and manual input, the process that takes the digit shift into account is performed. Consequently, the digit shift is automatically corrected and the serial number is accurately recognized. Furthermore, even if the error characters are included in the serial number A and the serial number B due to unsuccessful character recognition, the characters can be determined by the complement process. Consequently, the recognition rate of the character recognition can be increased.

Figure 12:
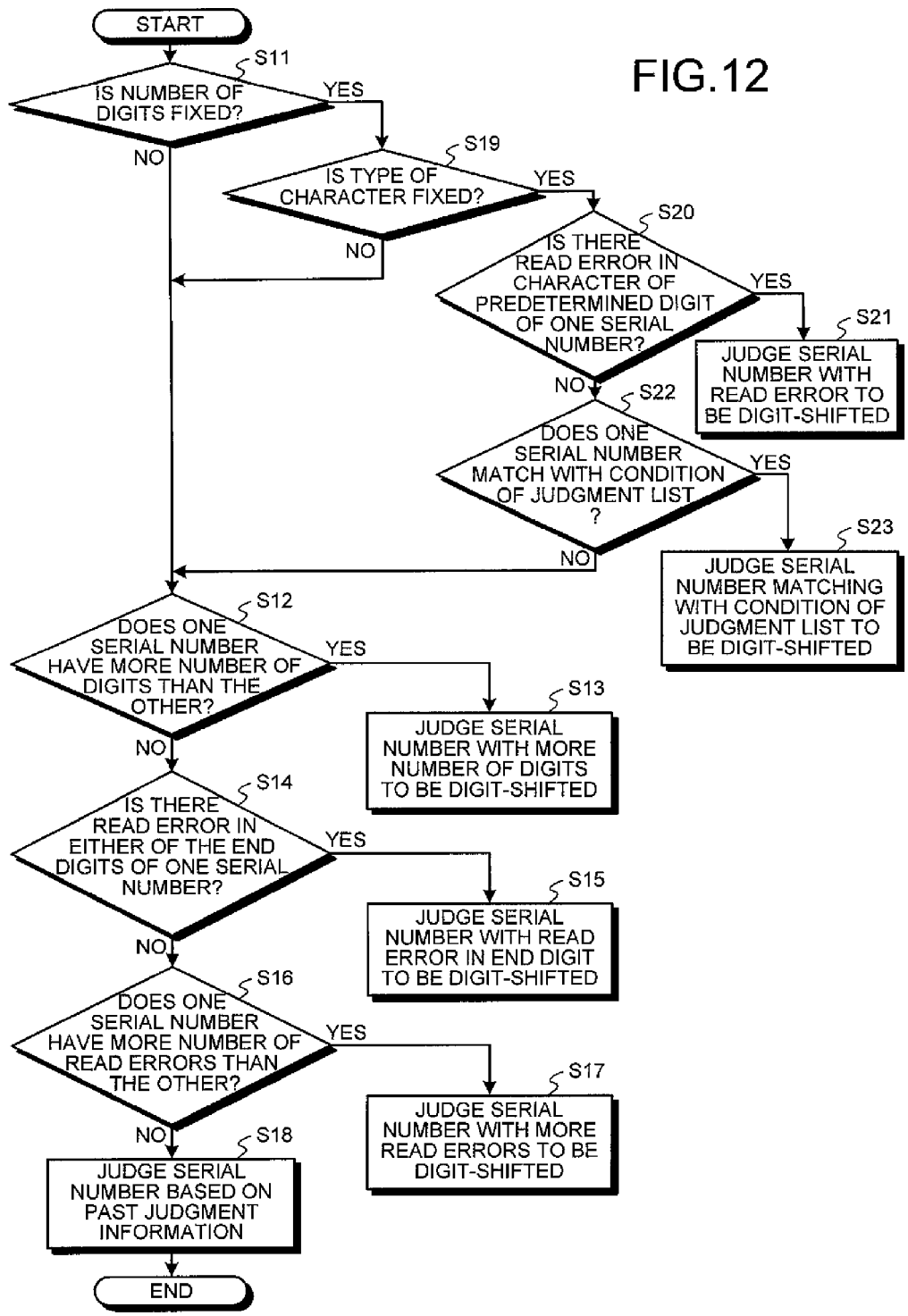
FIG. 12 is a flowchart of a method of specifying a digit-shifted serial number from recognition results of two serial numbers.

The process of judging the serial number in which digit shift has occurred shown in FIG. 6 (Step S4) is explained below in detail. FIG. 12 is a flowchart of the method of judging whether the digit shift has occurred in the serial number.

As explained above, there are serial numbers in which the number of digits is not fixed, the number of digits is fixed, the type of characters used in each digit is fixed, etc. Whether the number of digits is fixed or the type of the character corresponding to each digit is fixed can be judged based on the country in which the banknote is issued and the denomination of the banknote. Specifically, the composition condition of the serial number can be specified according to the country in which the banknote is issued and the denomination of the banknote. For example, it can be specified that the serial number and the type of character corresponding to each digit of certain denominations of the banknotes of the United States is fixed number of digits. Therefore, based on a denomination recognition result by the denomination recognition unit 21A of the banknote processing apparatus 2, the number of digits of the serial number of a denomination-recognized banknote and the type of character corresponding to each digit can be identified. Based on information pertaining to the composition condition of the serial number obtained from the denomination recognition result and the serial number data recognized by the serial-number recognition unit 38A included in the banknote management apparatus 3, it can be judged whether digit shift has occurred in the serial number.

Whether the number of digits is fixed is judged based on the denomination recognition result (Step S11). Relationship between the denomination, the number of digits of the serial number, and the type of character corresponding to each digit is stored beforehand in the processing-side memory unit 18 of the banknote processing apparatus 2, the management-side memory unit 35 of the banknote management apparatus 3, etc. The composition condition of the serial number of the processing target banknote is judged based on the relationship data.

If the number of digits of the serial number is not fixed (No at Step S11), the numbers of digits of the two character-recognized serial numbers are compared, if one serial number has more number of digits (Yes at Step S12), the serial number having more number of digits is judged to be digit-shifted (Step S13). The presence of stains or scribbling in the front or back of the serial number can lead to the stain or scribbling be misrecognized as a character in addition to the actual serial number, and therefore the serial number having more number of digits is judged to be the one in which digit shift has occurred.

If both the serial numbers have the same number of digits (No at Step S12), whether the end character of the recognized serial numbers is error character is judged (Step S14). If the rightmost (or the leftmost) character of the either of the serial numbers is an error character, and rightmost (or the leftmost) character of the other serial number is not an error character (Yes at Step S14), the serial number having an error character at the end is judged to be the serial number in which digit shift has occurred (Step S15). Even if the digit shift has occurred because of misrecognition of the stain or scribbling in the front or back of the serial number, the stain/scribbling is not recognized as either a Roman alphabetic character or a numeric character but as an error character. Therefore, if the leftmost or the rightmost character of either of the serial numbers is recognized to be an error character, it is judged to be due to digit shift.

If any end character in both the serial numbers is the error character or if any end character in both the serial numbers is not the error character (No at Step S14), whether the number of error characters in one serial number is greater than that in the other serial number (Step S16). If any serial number has a greater number of error character than the others (Yes at Step S16), the serial number having a greater number of error characters is judged to be digit-shifted (Step S17). The presence of stains or scribbling, which is the reason for the digit shift, can lead to the stain or scribbling be misrecognized as a character, and therefore the serial number with a greater number of error characters is judged to be the one in which digit shift has occurred.

If the serial number in which the digit shift has occurred is unable to be judged at the judgment method steps of Step S12, S14, and S16 (No at Step S16), the serial number that has a higher possibility of digit shift is judged based on processing data pertaining to the digit shift performed in the past (Step S18). When the matching ratio is improved by having the character determination unit 45 to perform the process of correcting the digit shift, related information is stored in the determination-condition memory 50 as processing history records. The serial number in which digit shift has occurred can be guessed by referring to this information.

Specifically, for example, in the past, if the serial number A having been character-recognized with a digit shift are greater in number compared to that of the serial number B in the same denomination of the processing target banknote on which the serial number that is being judged is printed, the digit shift is judged to have occurred in the serial number A. Apart from the presence of stain or scribbling in the front or back of the actual serial number, other reasons for the digit shift of the serial number to occur are a pattern or a design in the background of the serial number being misrecognized to be a character, and unsuccessful character recognition due to that the actual end character of the serial number becomes blurred or is obscured by the background pattern or design. Therefore, the serial number in which digit shift is more likely to occur can be guessed based on the characteristic of the banknote, such as, the pattern or the design in the area where the serial number is printed. From the information stored in the past, for example, if in a certain denomination, the serial number A is more likely to be recognized with a digit shift, the serial number A is judged to be the one in which the digit shift has occurred based on the stored information. Apart from the pattern or the design in the area in which the serial number is printed, other reasons for the occurrence of digit shift as a result of character recognition are the quality of the paper used in the banknote, the ink that is used for printing the serial number, and the like.

Furthermore, if the serial number B is digit-shifted in the banknotes that are processed immediately before the serial number being processed this time in a contiguous process of the banknotes, the digit shift is judged to have occurred repeatedly in the serial number B. Generally, a plurality of banknotes placed in the banknote depositing unit 12 of the banknote processing apparatus 2 is successively processed. Therefore, in a banknote bundle that is being processed, if the serial number B is more likely to be the one having a digit shift because the banknotes have been used in an environment in which staining is more likely to occur in the area in which the serial number B is printed, there is a greater possibility that the serial number B is recognized with a digit shift in contiguous banknotes. Specifically, a portion of a large number of banknotes in a banknote bundle being processed that is collected from an automatic vending machine, and the like, is likely to be stained at the same part of the banknote due to staining in a portion of a transport path, etc., in the automatic vending machine.

A case that the number of digits of the serial number is found to be fixed as a result of judgment at step S11 in FIG. 12 is explained next. If the number of digits of the serial number is found to be fixed (Yes at Step S11), whether the type of the characters is fixed is judged (Step S19). If the type of the characters is not fixed, subsequent process (Step S12) is continued in a similar manner to the case in which the number of digits is not fixed (No at Step S11).

If the type of characters is fixed (Yes at Step S19), whether the digit at a predetermined location of the serial number is an error character is judged (Step S20). If the digit at the predetermined location in one serial number is an error character (Yes at Step S20), the digit shift is judged to have occurred in the serial number (Step S21).

Generally, serial number character recognition is performed by comparing characteristics of each character recognized optically with template data that are characteristics of each character in the form of a Roman alphabetic character or a numeric character. If the characteristic of the target character coincides with the template data of a certain character, the target character is recognized to be the certain character. If the type of character used in each digit of the serial number is fixed, only the template of the fixed type of character is used to increase the recognition rate. Specifically, for example, if the type of character used in a certain digit is Roman alphabetic character, only a Roman alphabetic character template is used, and if the type of character used in a digit is numeric character, only a numeric character template is used. That is, a process for recognizing the numeric character is not performed on the digit that corresponds to the Roman alphabetic character and a process for recognizing the Roman alphabetic character is not performed on the digit that corresponds to the numeric character. Therefore, if due to digit shift, a numeric character is present in a digit where a Roman alphabetic character should have been present, chances of character recognition not being performed successfully and of the character being processed as an error character are higher. Similarly, if a Roman alphabetic character is present in a digit where a numeric character should have been present, chances of the character being recognized as an error character are higher.

For example, if in one of the two serial numbers, the type of character in leftmost end or the rightmost end is different from the one that should have been present, that serial number is judged to be digit-shifted. Furthermore, in a serial number in which the types of the characters used in a predetermined digit and the digit next to are different, if the types of characters that should have been present are not present on either side of the boundary where the type of character is different, the serial number is judged to be digit-shifted.

Specifically, for example, as explained above with reference to FIGS. 10 and 11, in the banknotes of the United States, the first, second, and eleventh digits of the 11-digit serial number are Roman alphabetic characters. However, if a stain, etc., is misrecognized to be the end digit, that is, the first or the eleventh digit, of the serial number, or if due to the digit shift, a numeric character is present in the end digit, that is, in the first or the eleventh digit, of which the character should be Roman alphabetic characters, chances of the character not being recognized successfully are higher. For example, that is why, in FIG. 10, the first digit of the serial number B that is digit-shifted in the right direction is recognized as the error character, and in FIG. 11, the last digit of the serial number B that is digit-shifted in the left direction is recognized as the error character.

Furthermore, as shown in the serial number A of FIGS. 10 and 11, the second and third digits as well as the tenth and eleventh digits form the boundaries from which the type of character is changed. When a digit shift occurs, at the digit location where adjacent digits have different types of characters, a character of the same type is for the adjacent digit where a character of a different type should have been present. Consequently, the likelihood of the character being recognized as the error character is high. That is why the third and eleventh digits in the serial number B in FIG. 10 that is digit-shifted in the right direction are recognized as the error characters, and the second and tenth digits in the serial number B in FIG. 11 that is digit-shifted in the left direction are recognized as the error characters.

Thus, when the number of digits of the serial number and the type of character used in each digit of the serial number are fixed, if the type of character of a predetermined digit is different from the type that corresponds to that digit, it can be judged that a digit shift has occurred.

If the type of the character that is recognized matches the type of character corresponding to that digit or if the type of recognized characters in both the serial numbers do not match (No at Step S20 of FIG. 12), a decision table is referred to (Step S22). The decision table is a list of conditions for judging that the digit shift has occurred. If recognized serial number meets a condition in the decision table (Yes at Step S22), the digit shift is judged to have occurred in the recognized serial number.

In the method of judgment based on the presence of the error character in a predetermined digit (Step S20), a digit shift can be judged to have been occurred in cases where the type of character in each digit of the serial number is fixed and the error character is used for the digit in which the type of character found to be different from the type corresponding to the digit or the character in the digit is not recognized. However, in the above method (Step S20), there are times when judgment cannot be made as to whether a digit shift has occurred. This case is explained concretely with reference to FIGS. 13 and 14, in which the banknote serial number "ID12345678A" is used as an example.

As shown in a recognition example 1 of FIG. 13, in a case in which the banknote serial number is shifted right one digit during character recognition, it would be typically recognized as "?I?1234567?". As shown in a recognition area of FIG. 13, if a stain, and the like, is recognized as the first digit, because there is actually no character in that area, the error character is allocated to the first digit due to unsuccessful character recognition, as shown in the recognition example 1. Furthermore, in the third digit, because a Roman alphabetic character is present where a numeric character should have been present, character recognition is performed unsuccessfully. In the eleventh digit, because a numeric character is present where a Roman alphabetic character should have been present, character recognition is performed unsuccessfully. As a result, the first, third, and eleventh digits are error characters. However, in this case, the above method (Step S20) can be used to judge the digit shift.

As shown in a recognition example 2 of FIG. 13, for example, because the eleventh digit is a Roman alphabetic character, character recognition for a Roman alphabetic character is performed. As a result, in spite of the actual character being the numeric character "8", it can be misrecognized as the Roman alphabetic character "B". In this case, a normal recognition of the Roman alphabetic character "B" is performed, and no error character is allocated to the eleventh digit. However, in this case, too, the above method (Step S20) can be used to judge the digit shift, because the first and third digits are error characters.

As shown in a recognition example 3 of FIG. 13, if the Roman alphabetic character "D" in the third digit is recognized as the numeric character "0", and the stain or the scribbling in the area where there is no serial number is recognized as "I" and the characters in the first digit, the first, third, and eleventh digits are regarded to be correctly recognized results because they are of the type that should be present in the respective digits. Therefore, the above method (Step S20) cannot be used to judge the digit shift.

For such cases, a decision table is developed beforehand and stored in the determination-condition memory unit 49. FIG. 14 is an example of the decision table. The digit having the symbol "*" indicates that any character could be for the digit, and the digit having either a Roman alphabetic character or a numeric character indicates that if the indicated character is for the digit, the serial number should be judged to be digit-shifted. For example, in the topmost row in the decision table of FIG. 14, even if the third digit, which should be a numeric character, has the numeric character "0", the actual character may be the Roman alphabetic character "D", and therefore, there is a possibility that a digit shift has occurred. Similarly, in the same row, even if the eleventh digit, which should be a Roman alphabetic character, has the Roman alphabetic character "B", the actual character may be the numeric character "8", and therefore, there is a possibility that a digit shift has occurred. The decision table thus lists the character recognition results that are likely to be digit-shifted, even if the type of character in each digit in the character recognition result matches with the type of character that can be used in that digit. When the recognition result matches the content of the table, the serial number data can be judged to be digit-shifted. The Roman alphabetic characters and the numeric characters that can often be mutually mistaken for each other, such as, "1, 2, 5, 6, 8, and 0" among the numeric characters, and "I, Z, S, B, D, and O" among the Roman alphabetic characters, are included in the decision table, as shown in FIG. 14.

The type of character used in each of the serial number is fixed according to the country in which the banknote is issued and the denomination of the banknote. Thus, it is preferable that a separate decision table be prepared based on the types of characters used in the banknote, and the decision table corresponding to the banknote that is being character-recognized be used. By preparing separate decision tables, for example, in the case of a banknote in which "1" is not used in a particular digit, even if the digit is a numeric character digit, a process related judgment of "1" need not be performed. Consequently, overall processing amount can be reduced, and processing can be speeded up.

Figure 15:
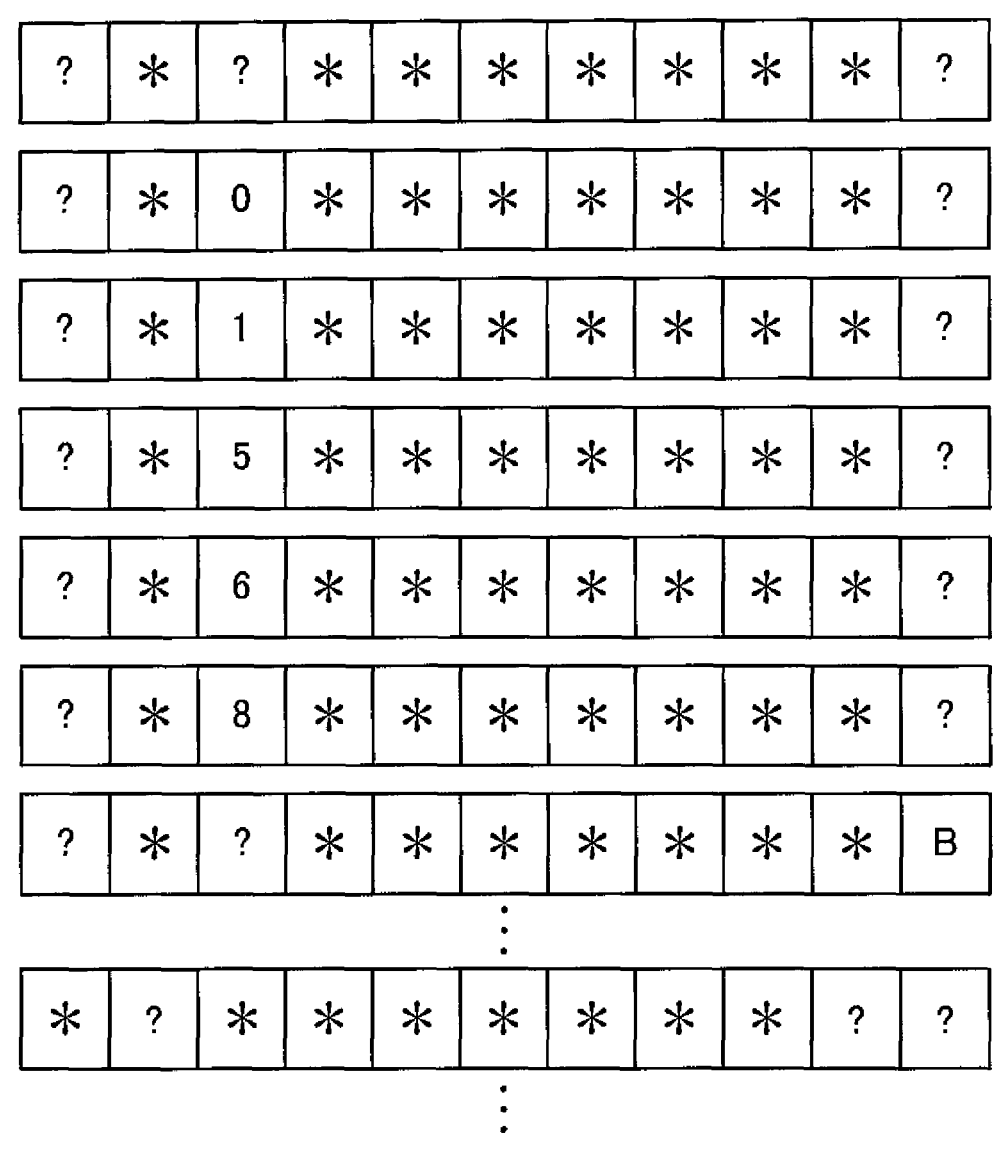

As explained above, the method of judgment of a predetermined digit being an error character (Step S20) can be an operation that is independent from the method in which the decision table is used (Step S22), or both the methods (Steps S20 and S22) can be processed in one operation. In the latter case, because the judgment process pertaining to the error character (Step S20) and the judgment process pertaining to the character, a Roman alphabetic character or a numeric character, that can be mutually miss-recognized for each other (Step S22), are simultaneously performed in one operation, the decision table will include the error characters "?", as shown in FIG. 15. The processes performed when the type of character used in each digit is fixed (Steps S20 to S23), shown in FIG. 12, are combined into one process, and the serial number in which the digit shift has occurred can be judged solely by comparing with the decision table shown in FIG. 15.

In the above explanation, a case in which the serial number is digit-shifted in the right direction has been explained; the decision table can be similarly generated and the digit-shifted serial number is judged for the serial number that is digit-shifted in the left direction. The bottommost row in each of the FIGS. 14 and 15 shows examples of the cases in which the serial number is digit-shifted in the left direction.

Settings of the judgment methods explained above can be modified by the management-side operating unit 32. Specifically, settings, such as, the judgment method or judgment methods to be used, a judgment sequence, and judgment content, can be set as required. The settings made by the user are stored in the determination-condition memory unit 49 and used by the character determination unit 45.

Thus, judgment of the digit-shifted serial number is performed by taking into account the number of digits and the recognition results of predetermined digits. Consequently, the judgment of the digit shift is performed automatically without the need for a visual confirmation by the user. By performing the process of correcting the digit shift of the serial number explained above (Steps S5 to S9 of FIG. 6) based on the judgment result, the serial number data without any digit shift can be registered in the database 33 for future use.

The method of searching for a serial number while taking the digit shift into account is explained below with reference to FIGS. 16 to 18. As explained above, by performing the processing of correcting the digit shift and determining the character of each digit composing the serial number data, an effect of the digit shift can be suppressed. Particularly, when the number of digits in the serial number is fixed, and furthermore, when the type of character used in each digit is fixed, the digit shift can be accurately judged, and the digit-shifted serial number data can be corrected to the serial number data devoid of digit shift.

However, it is likely that some of the serial number data that is registered in the database 33 after character recognition by a conventional method may be digit-shifted. If the banknote images are stored along with the serial number data, the banknote images can be used for performing the serial number recognition process explained above, and the digit-shifted serial number data in the database 33 can be replaced with the digit-shift-corrected serial number data. However, performing the recognition process again will take considerable time and effort.

One of the features of the banknote management system according to the present invention, which includes the above-explained banknote processing apparatus 2 and the banknote management apparatus 3, is to enable searching of a serial number while taking the digit shift into account. That is, when searching the database for the serial number data, the effect of the digit shift is suppressed by applying the above-explained process pertaining to the digit shift, and the intended serial number data is retrieved with accuracy from among the entire serial number data that includes the serial number data registered in the database 33 with the digit shift.

Apart from being used for searching the database 33 registered in the past without performing the digit shift correction, the method explained below can also be used for performing a comparison process using a character recognition result by a conventional device in which the above explained process of correcting the digit shift is not possible.

As an example, a case is explained below in detail in which a plurality of pieces of serial number data registered in the database 33 without correction of the digit shift is a comparison source, and a serial number of a counterfeit note is a comparison target, and the serial number data matching the serial number of the counterfeit note is retrieved from the database 33 by comparing the comparison source and the comparison target while taking the digit shift into account.

Figure 16:
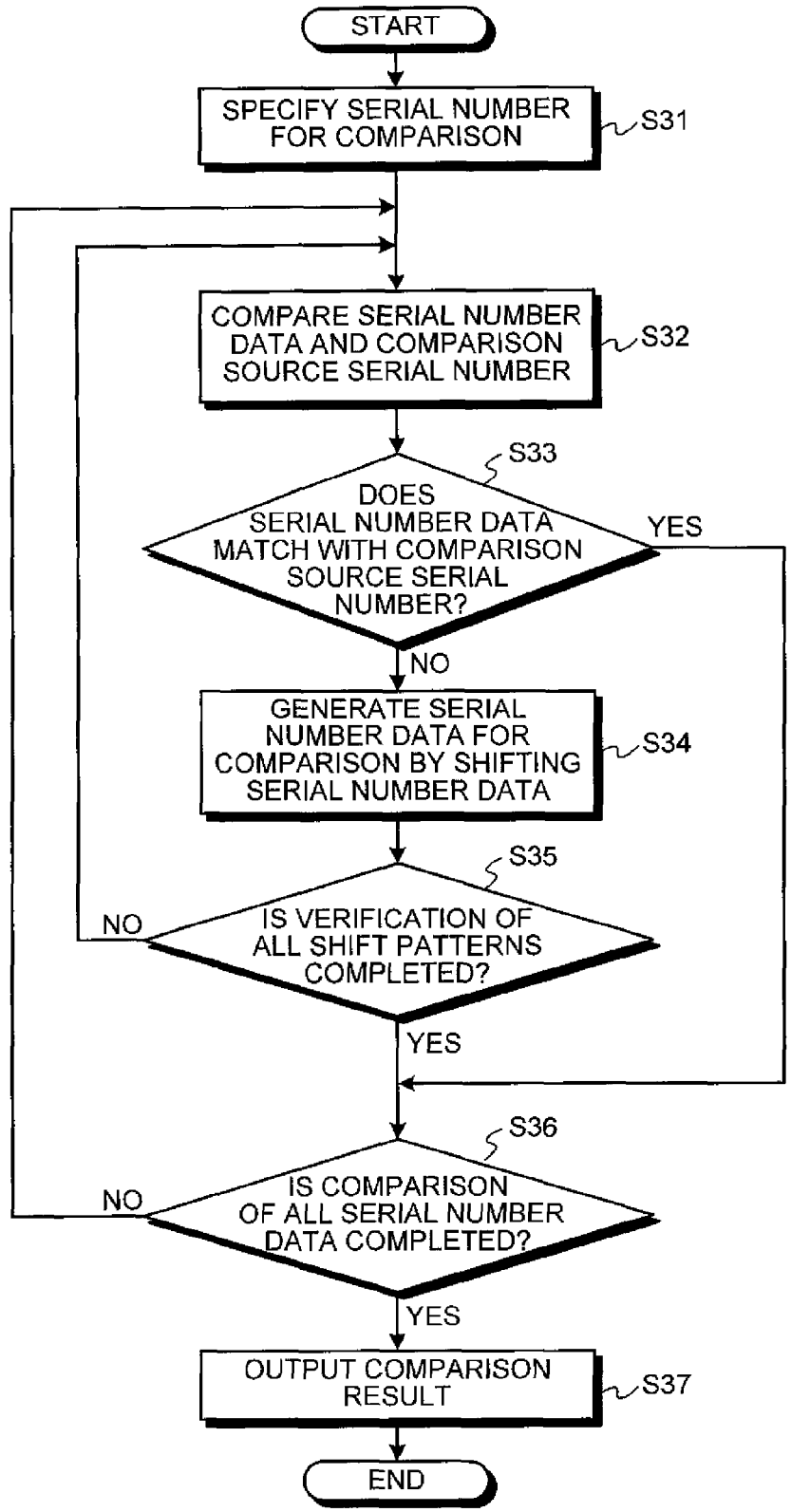
FIG. 16 is a flowchart of a processing operation pertaining to a serial number search process performed inside a search control unit of the banknote management apparatus.

FIG. 16 is a flowchart of the comparison method of the serial numbers while taking the digit shift into account. Comparison source data and comparison target data can be specified using the search-target input unit 32C on the display unit 31 of the management-side operating unit 32.

Figure 17:
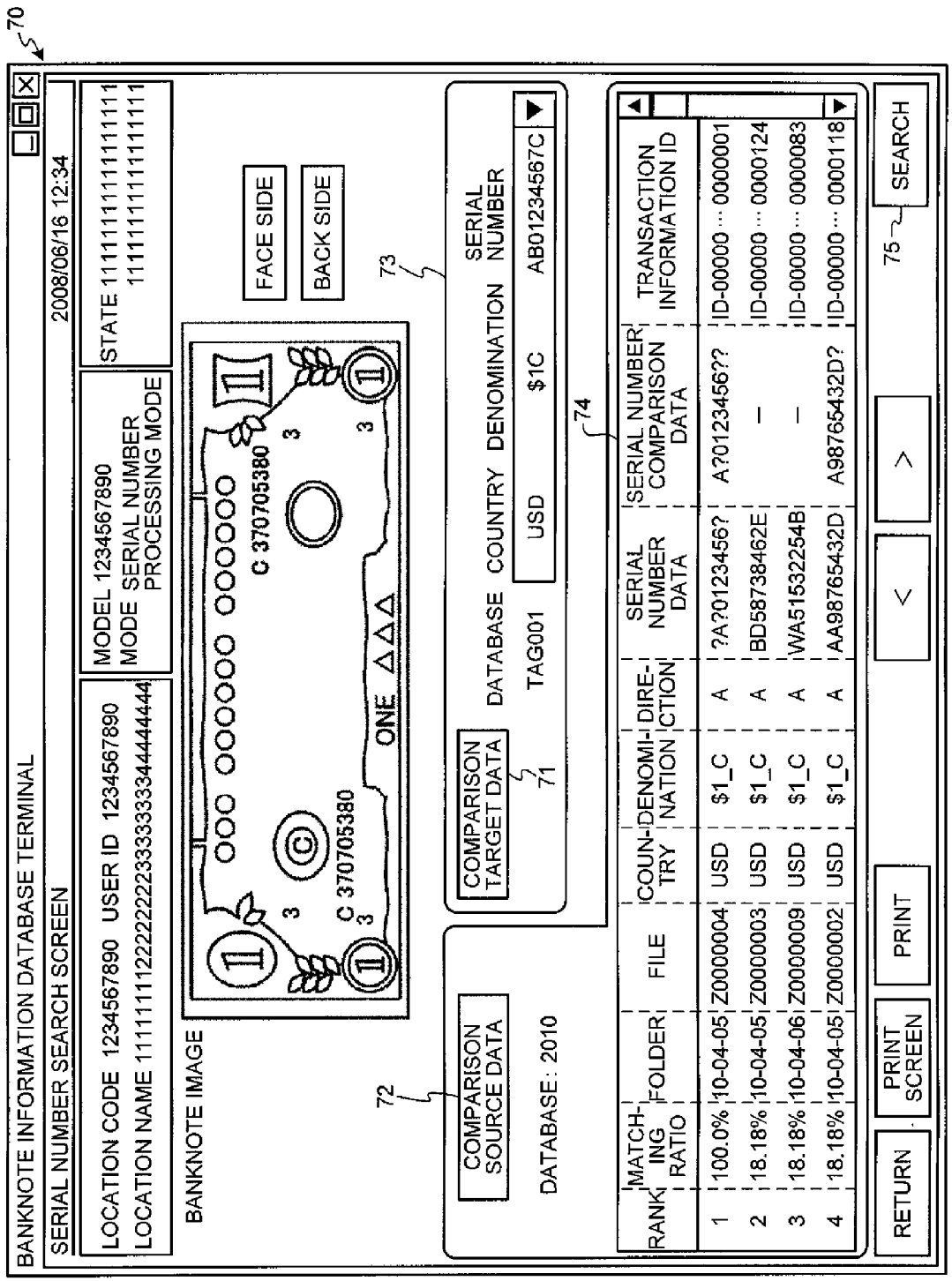
FIG. 17 is a drawing showing a serial number search screen displayed on a display unit of the banknote management apparatus.

FIG. 17 is an example of a search screen displayed on the display unit 31 of the banknote management apparatus 3. A comparison target data button 71 on the screen is used for specifying the serial number of the counterfeit note as the comparison target serial number. A comparison source data button 72 is used for specifying the database 33 in which the comparison source serial numbers are registered and which is to be searched for the serial number data that matches the serial number of the counterfeit note. The comparison source data, for example, is the database 33 pertaining to the banknotes processed in a certain period of time or at a certain location. A search button 75 on the bottom right of the screen is used for starting a search process.

Upon specification of the serial number of the counterfeit note that is the comparison target data (Step S31 of FIG. 16), and the database 33 that is the comparison source, comparison of the specified data is commenced (Step S32). If the matching ratio of the serial number data in the database 33 and the serial number of the counterfeit note is higher than or equal to the predetermined value (Yes at Step S33), the next process pertaining to the data is commenced (No at Step S36). The process is continued until comparison of all the data present in the database 33 is completed (Yes at Step S36).

If the serial number of the counterfeit note that is the comparison target data, and the serial number data that is the comparison source data do not match (No at Step S33), taking into account the likelihood of a digit shift, the character of each digit composing the serial number data that is the comparison source data is shifted to generate serial number data for comparison (Step S34). Because the serial number data that is registered without taking the digit shift into account is digit-shifted data in spite of actually matching with the serial number of the counterfeit note that is the comparison target data, it is likely to be judged as not matching. Consequently, each digit of the serial number data is shifted as explained above in the process pertaining to digit shift with reference to FIG. 6, and it is checked whether the digit-shifted serial number data matches with the serial number of the counterfeit note that is the comparison target.

Figure 18:
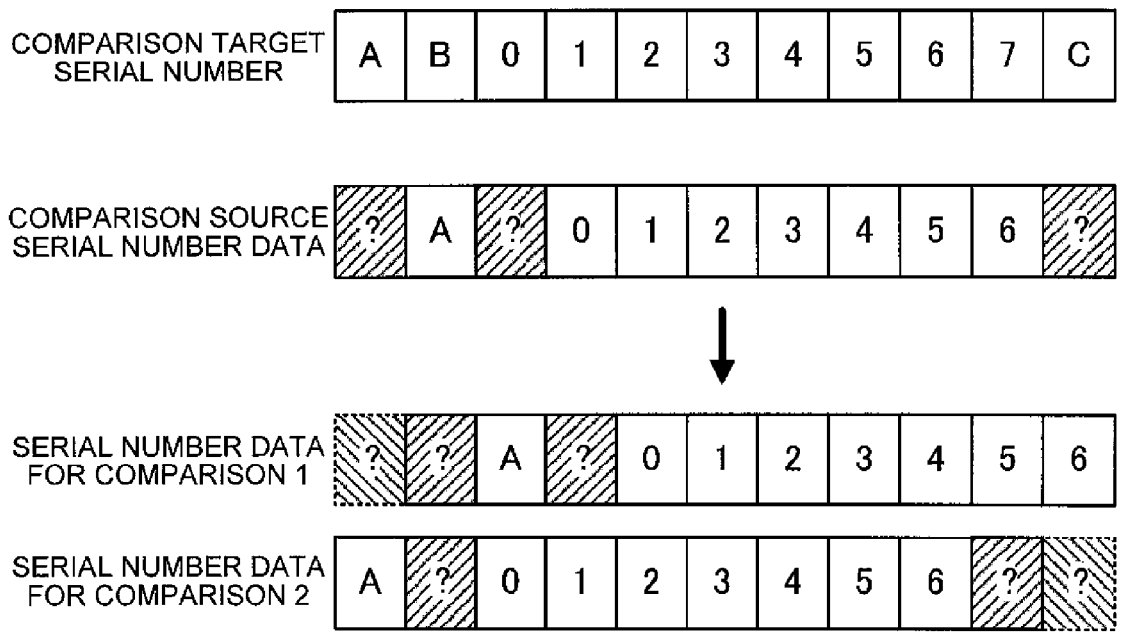
FIG. 18 is a drawing showing serial number data for comparison that is used for performing a serial number search while taking the digit shift into account.

Specifically, as shown in FIG. 18, if the serial number of the counterfeit note that is the comparison target data is "AB1234567C", and the serial number data that is the comparison source data is "?A?0123456?", the matching ratio of 0% will be attained, and the comparison target data and the comparison source data will be judged as not matching (No at Step S33 of FIG. 16). Therefore, the serial number data that is the comparison source data is shifted right one digit to generate a serial number data for comparison 1 and left one digit to generate a serial number data for comparison 2 (Step S34). The direction in which the serial number is shifted and the number of digits which the serial number is shifted are stored as the shift pattern in the management-side memory unit 35. A predetermined condition that is set beforehand can be used in the shift pattern or the settings can be modified by the management-side operating unit 32. The shift patterns are explained above with reference to FIG. 6, and hence not explained in detail here.

Once the serial number data for comparison are generated by shifting the serial number data that is the comparison source data according to the shift pattern, the serial number of the counterfeit note that is the comparison target is compared with it (Step S32). If, as a result of the comparison, the matching ratio of the serial number data for comparison that is the comparison source data, and the serial number of the counterfeit note as the comparison target data is higher than or equal to the predetermined value (Yes at Step S33), the serial number data for comparison and the matching ratio are registered, and the process pertaining to the serial number data is ended. Thereafter, the next serial number data is read as the comparison source data from the database 33, and the process pertaining to that serial number data is commenced (No at Step S36). The process is continued until comparison of all the serial number data in the database 33 selected as the comparison source is completed (Yes at Step S36).

If, as a result of the comparison, the matching ratio of the serial number of the counterfeit note that is the comparison target, and the serial number data for comparison of the database 33 that is the comparison source is not higher than or equal to the predetermined value (No at Step S33), the next serial number data for comparison is generated according to the shift pattern (Step S34) and is compared once again with the serial number of the counterfeit banknote that is the comparison target data (Step S32). In this manner, until the verification of all the shift patterns that take the digit shift into account is completed (Yes at Step S35), the process of comparison of the serial number data that is the comparison source data, and the serial number of the counterfeit note that is the comparison target data is repeated.

For example, in the example shown in FIG. 18, the serial number data for comparison 1 obtained by shifting the serial number data that is the comparison source data right one digit does not match with the comparison target serial number (No at Step S33 of FIG. 16). However, when the comparison source serial number data is shifted left one digit to attain the status of the serial number data for comparison 2 of FIG. 18 (Step S34) by repeating the process of comparison with the comparison target serial number while shifting the serial number data according to the shift pattern, a matching ratio of 100% is attained (Yes at Step S33). After the information pertaining to the matching ratio, etc., is registered, the process of the current serial number data is ended, and a process of the next serial number data is commenced (No at Step S36).

In this manner, once the comparison of the specified (Step S31) serial number of the counterfeit note with all the serial number data in the database 33 and the serial number data for comparison obtained by shifting the serial number according to the shift pattern is ended (Yes at Step S36), the comparison result is displayed on the display unit 31 (Step S37).

Examples of the comparison result are shown in FIG. 17. In this manner, information 73 pertaining to the serial number of the counterfeit note that is the comparison target data and information 74 pertaining to the serial number database that is the comparison target source are displayed on the display unit 31.

A name of the database specified by the comparison target data button 71, the country in which the banknote is issued, the denomination, the serial number, etc., are displayed as the information 73 pertaining to the serial number of the counterfeit note. The name of the database is displayed below the comparison source data button 72 as information pertaining to the database 33 specified by the comparison source data button 72, and a search result 74 is displayed below the name of the database. In the search result 74 are displayed, from the left of the screen, a ranking that indicates the possibility of a match with the serial number of the counterfeit note, the matching ratio on which the ranking is based, a folder name and a file name where the serial number data corresponding to the matching ratio is kept, the country in which the banknote is issued, information pertaining to the denomination, an orientation, the serial number data, the serial number data for comparison that is used for attaining the matching ratio, and a transaction information ID that can be used for specifying the transaction details pertaining to the banknote.

In the serial number shown as an example in FIG. 18, the matching ratio is 0% in the state in which the serial number is stored in the database 33. However, when matched after the shift process performed by taking the digit shift into account, a matching ratio of 100% is attained, and as shown in FIG. 17, this matching ratio is placed topmost as the first matching ratio in the search result 74. In addition to the serial number data stored in the database 33, the serial number data for comparison that is used for attaining the matching ratio is also displayed in the search result 74. Therefore, the user can confirm that the matching ratio displayed in the search result 74 is obtained by the serial number data for comparison obtained by shifting the serial number data and not by the serial number data in the state in which it is stored in the database 33.

When any row is selected in the search result 74, a banknote image corresponding to the selected data is displayed on the screen. Consequently, the user can check the serial number on the banknote image and easily verify that there are no errors in the search result of the serial number. That is, whether the judgment performed after the digit shift is correct can be checked by comparing on the display unit 31 the serial number on the banknote image and the serial number of the counterfeit note.

When the character recognition result obtained with a conventional device is used in the above-mentioned comparison process of the serial numbers, the search result 74 would show the information 73 pertaining to the serial number of the counterfeit note that is the comparison target data, information pertaining to the character recognition result that is the comparison source data, and the banknote image.

If a counterfeit note database containing the serial numbers of a plurality of counterfeit notes is specified as the comparison target data, the serial numbers are displayed in a list box on the display unit 31. The serial number of the counterfeit note whose search result is to be confirmed can be individually selected from the list box, and the search result 74 of the selected serial number is displayed. The search result can be printed out in a predetermined form, such as, a list and a report.

In the above example, when confirming a matching degree of two serial numbers, the error characters are excluded and only the digits that have been recognized are used in the calculation of the matching degree as the matching ratio. Calculating the matching ratio is not limited to the method described above; the matching ratio can also be calculated by using the characters of all the digits, including the error characters. Specifically, in the example shown in FIG. 18, if the comparison target serial number and the serial number data for comparison 2 are compared by excluding the error characters, a matching ratio of 100% is attained, as explained above. On the other hand, if the matching ratio is calculated using all the digits including the error characters, because the characters of only eight digits match out of the eleven digits between the comparison target serial number and the serial number data for comparison 2, the matching ratio attained is 72.73%. Either of the methods can be used for the calculation of the matching ratio if it can be judged from the change in the matching ratio that the digit shift has been corrected.

Thus, by taking the digit shift into account and performing the comparison process after shifting the serial number data, a target serial number that is searched can be accurately found. The serial number data that is registered in the database without taking the digit shift into account can also be searched accurately. Consequently, the database built in the past can be efficiently utilized.

In the present embodiment, the matching ratio is calculated after the character recognition result of the serial number is shifted, and the digit shift of the serial number is corrected based on the value of the matching ratio. Specifically, as shown in FIG. 7, if a nine-digit banknote serial number is character-recognized as a ten-digit serial number B including the error characters, the serial number B is shifted and the matching ratio is calculated. In the process of calculating the matching ratio after shifting the serial number, the serial number including the error characters is cut either from the first upper digit or from the first lower digit by the number of digits by which it exceeds the original banknote serial number. The matching ratio is calculated using the serial number remaining after cutting. Specifically, in the serial number B shown in FIG. 7, because the original nine digits of the banknote serial number is recognized as a ten digit serial number, the excess one digit of the serial number B is cut from the first upper digit to calculate the matching ratio. If the calculated matching ratio is higher than or equal to the predetermined value, the digit shift is corrected by taking the recognition result of the serial number as the serial number obtained after the extra digit is cut. Furthermore, similar to the shifting process of the serial number in which the serial number is shifted in the left direction and in the right direction, the recognition results of the serial numbers are evaluated after calculating the matching ratio for the serial number obtained after cutting from the first digit side and the serial number obtained after cutting from the first lower digit by the number of digits by which it exceeds the number of digits of the original serial number. Of the serial number obtained after cutting from the first upper digit and the serial number obtained after cutting from the lower digit side, whichever has a greater matching ratio that is higher than or equal to a predetermined reference value is regarded as the properly corrected serial number.

As explained above, according to the present invention, the effect of the digit shift can be suppressed when performing character recognition of a serial number printed on a banknote. If the number of digits of the serial number and the type of character used in each digit are fixed, or if character recognition is not performed successfully at a predetermined location due to which the error character is allocated to the location, the digit shift can be found based on the composition of the serial number or the recognition result of the serial number. Consequently, the digit shift can be recognized and corrected with high accuracy.

Furthermore, the digit-shift-corrected serial number data is registered in the database. Consequently, when searched anytime in the future, the serial number data can be accurately found.

Furthermore, a search process of the serial number data that takes the digit shift into account can be performed. Consequently, the matching serial number can be accurately found even when searching the serial number data registered in the past without taking the digit shift into account or when performing comparison using the serial number data obtained as the character recognition result by the conventional device.

When the shift process in which the digit shift is taken into account is performed, all the serial number data are not shifted in the same way; instead, a shift pattern is set according to the recognition result of the serial number and the shifting process is performed according to the set shift pattern. Consequently, the process time can be reduced and the process can be performed more efficiently compared to when unnecessary shift patterns not suited to the recognition results are used. These processes are automatically performed inside the apparatus. Consequently, a load on the user is reduced. Furthermore, the serial number data can be recognized and searched with the same degree of accuracy as when a visual confirmation is performed by the user.

The above functions and operations are not limited to the identification number printed on banknotes and can be equally applied to any identification number printed on other paper sheets, such as, checks, drafts, gift coupons, and similar advantages can be obtained.

The paper-sheet management method and the paper-sheet management system according to the present invention are useful when the character-recognized data and the data registered in the database are digit-shifted when character recognition of the identification number printed on the paper sheet is performed to register the recognition result in the database, and when the database is searched for an identification number that matches a predetermined identification number.

According to the present invention, a first identification number that is character-recognized is compared with an identification number of a counterfeit note or a second identification number that is an identification number character-recognized in a different area, and if a matching ratio is lower than a predetermined reference value, a digit shift is judged to have occurred. To correct the digit shift, the character of each digit of the first identification number is shifted, and if, as a result, the matching ratio satisfies the reference value, the digit shift is judged to have been corrected. Because the first identification number is corrected to the number obtained after shifting, a digit-shift-corrected identification number can be automatically obtained.

According to the present invention, when a plurality of the identification numbers is printed on the same paper sheet, the character-recognized two identification numbers are compared and the digit shift, if any, is corrected. Consequently, character recognition of the identification number on the paper sheet can be performed with high accuracy.

According to the present invention, when performing character recognition of a plurality of the identification numbers, between the two identification numbers that have a high matching ratio after correction of the digit shift, the character of the digit in which character recognition is not performed successfully is complemented. Consequently, the character recognition rate of the identification number can be increased.

According to the present invention, the digit-shift-corrected identification number is registered in the database. Consequently, when searching the database anytime in the future, the identification number can be retrieved with high accuracy. That is, in spite of being actually present in the database, a situation where a serial number cannot be found, because of the digit shift will not come out.

According to the present invention, when comparing the serial number character-recognized on the banknote and the serial number of the counterfeit note registered in the database, the digit shift of character-recognized serial number is corrected before comparing. Consequently, the serial number that matches with the serial number of the counterfeit note can be found with high accuracy.

According to the present invention, whether a digit shift has occurred in the character-recognized identification number is judged, and if the identification number is judged to be digit-shifted, the character of each digit is shifted to correct the digit shift. Consequently, the digit shift can be corrected efficiently.

According to the present invention, out of the two identification numbers that are supposed to match, if the number of digits in one identification number exceeds the number of digits of the other identification number or the character in a first digit or a last digit of the identification number has not been recognized, the identification number is judged to be digit-shifted. Consequently, the digit shift can be judged and corrected with high accuracy.

According to the present invention, when performing character recognition of the identification number in which the type of character used in each digit is fixed, if the type of characters that should be at the digit locations where the type of character changes, that is, where a Roman alphabetic character and a numeric character are adjacent to each other, is not present, a digit shift is judged to have occurred. Consequently, the digit shift can be judged and corrected with high accuracy.

According to the present invention, when performing character recognition of the identification number in which the type of character used in each digit is fixed, even if the type of character of each digit is what it should be, if the character recognition result shows a character that can be mutually mistaken between a Roman alphabetic character and a numeric character, a digit shift is judged to have occurred. Consequently, a digit shift can be judged with high accuracy even if the result of character recognition includes an incorrectly recognized character.

According to the present invention, a digit shift is judged based on a paper sheet image generated by a paper-sheet processing apparatus, and the identification number information in which the digit shift is corrected is generated. Consequently, character recognition of the identification number can be performed with high accuracy while using the conventional paper-sheet processing apparatus, such as, a banknote processing apparatus or a scanner, and the obtained data can be used in the database, etc.

The present invention in its broader aspects is not limited to the specific details and representative embodiments shown and described herein, but is to be construed as embodying all modifications and alternative constructions that may occur to one skilled in the art which fairly fall within the basic teaching herein set forth.

The invention claimed is:

1. A paper-sheet management method of managing a paper sheet based on an identification number printed on the paper sheet, the method comprising:
   acquiring a first identification number by performing character recognition on each of a plurality of character data read from a first area in which the identification number is printed on the paper sheet, and allocating a predetermined character when the character recognition is unsuccessful;
   calculating a first matching ratio representing a ratio by which characters in the same digit in both the first identification number acquired at the acquiring and a second identification number stored in a storage unit match;
   shifting each character forming the first identification number one digit in a left direction or a right direction when the first matching ratio calculated at the calculating is lower than a predetermined reference value, thereby obtaining a shifted identification number;
   calculating a second matching ratio representing a ratio by which characters in the same digit in both the shifted identification number shifted at the shifting and the second identification number match, and
   replacing the first identification number by the shifted identification number when the second matching ratio is equal to or higher than the predetermined reference value.

2. The paper-sheet management method according to claim 1, wherein the first identification number is a number obtained by performing character recognition of a first paper-sheet identification number printed on the paper sheet, and the second identification number is a number acquired at the acquiring by performing character recognition of a second paper-sheet identification number printed in a second area on the paper sheet different from the first area.

3. The paper-sheet management method according to claim 1, further comprising:
   complementing a recognition result of a certain digit, when between characters in the certain digit in both the first identification number after the replacing and the second identification number, one of the characters is an allocated character allocated as a result of an unsuccessful character recognition and the other one of the characters is a recognized character obtained by successful character recognition, with the recognized character.

4. The paper-sheet management method according to claim 3, further comprising:
   registering in a database at least one of the first identification number after the replacing and the first identification number after the complementing.

5. The paper-sheet management method according to claim 1, wherein the paper sheet is a banknote, and the second identification number is a serial number of a counterfeit note.

6. The paper-sheet management method according to claim 1, wherein the shifting further includes judging whether the first identification number is digit-shifted relative to the second identification number.

7. The paper-sheet management method according to claim 6, wherein the judging includes deciding that the first identification number is digit-shifted when the number of digits in the first identification number exceeds the number of digits in the second identification number.

8. The paper-sheet management method according to claim 7, wherein the judging includes deciding that there exists a digit shift when a character on any one of a leftmost or a rightmost character of the first identification number is an allocated character allocated as a result of an unsuccessful character recognition.

9. The paper-sheet management method according to claim 8, wherein the judging includes deciding that there exists the digit shift when the first identification number is a number obtained by performing character recognition of an identification number, of which a type of a character that can be used in each of the digits being fixed, and the type of character that should have been used in at least one of adjacent digits, where different types of characters should be used, has not been used in the first identification number.

10. The paper-sheet management method according to claim 9, wherein the judging includes deciding that there exists the digit shift when the first identification number is a number obtained by character recognition of an identification number in which a plurality of characters is fixed as usable characters in each of the digits and a character in a certain digit in the first identification number is known as a character that is likely to be misrecognized among those plurality of characters.

11. The paper-sheet management method according to claim 10, wherein the first identification number is a number obtained by character recognition of an identification number composed of Roman alphabetic characters and numeric characters, and the judging includes deciding that there exists the digit shift when at least one of Roman alphabetic characters B, D, I, O, S is recognized in a certain digit of the first identification number at which the Roman alphabetic characters can be used and at least one of numeric characters 0, 1, 2, 5, 6, 8 is recognized in a certain digit of the first identification number at which numeric characters can be used.

12. A paper-sheet management method of managing a paper sheet based on an identification number printed on the paper sheet, the method comprising:
   acquiring a first identification number by performing character recognition on each of a plurality of character data read from a first area in which the identification number is printed on the paper sheet, and allocating a predetermined character when the character recognition is unsuccessful;
   calculating a first matching ratio representing a ratio by which characters in the same digit in both the first identification number acquired at the acquiring and a second identification number stored in a storage unit are matching;

judging that there exists a digit shift when the first matching ratio is lower than a predetermined reference value and number of digits in the first identification number exceeds number of digits in the second identification number;

cutting character strings composing the first identification number, by a number equal to an excess number of digits calculated at the judging, from the first digit to right direction and from the last digit to left direction;

calculating a first-digit-cut second-matching ratio representing a ratio by which characters in the same digit in both a first-digit-cut first identification number obtained by cutting the character strings of the first identification number from the first digit to right direction and the second identification number are matching, and a last-digit-cut second-matching ratio representing a ratio by which characters in the same digit in both a last-digit-cut first identification number obtained by cutting the character strings of the first identification number from the last digit to left direction and the second identification number are matching; and replacing the first identification number, when a higher one between the first-digit-cut second-matching ratio and the last-digit-cut second-matching ratio is equal to or higher than the predetermined reference value, by the first-digit-cut first identification number or the last-digit-cut first identification number that includes the higher of the second matching ratios.

13. The paper-sheet management method according to claim 12, wherein the first identification number is a number obtained by performing character recognition of a first paper-sheet identification number printed on the paper sheet, and the second identification number is a number acquired at the acquiring by performing character recognition of a second paper-sheet identification number printed in a second area on the paper sheet different from the first area.

14. A paper-sheet management system that manages a paper sheet based on an identification number printed on the paper sheet, the paper-sheet managing system comprising:
    a paper-sheet processing apparatus including
        an image capturing unit that captures an image of the paper sheet by scanning a surface of the paper sheet, and
        a transmitting unit that transmits the image; and
    a paper-sheet management apparatus including
        a receiving unit that receives the image from the paper-sheet processing apparatus, and
        a character recognition unit that performs character recognition on each of a plurality of character data read from a first area in which the identification number is printed on the paper sheet, and allocates a predetermined character when the character recognition is unsuccessful; and
        a character determination unit that
            calculates a first matching ratio representing a ratio by which characters in the same digit in both a first identification number and a second identification number are matching,
            shifts each character forming the first identification number one digit in a left direction or a right direction when the first matching ratio is lower than a predetermined reference value, thereby obtaining a shifted identification number,
            calculates a second matching ratio representing a ratio by which characters in the same digit in both the shifted identification number and the second identification number are matching, and
            replaces the first identification number by the shifted identification number when the second matching ratio is equal to or higher than the predetermined reference value.

15. A paper-sheet management system that manages a paper sheet based on an identification number printed on the paper sheet, the paper-sheet managing system comprising:
    a paper-sheet processing apparatus including
        an image capturing unit that captures an image of the paper sheet by scanning a surface of the paper sheet, and
        a transmitting unit that transmits the image; and
    a paper-sheet management apparatus including
        a receiving unit that receives the image from the paper-sheet processing apparatus,
        a character recognition unit that performs character recognition on each of a plurality of character data read from a first area in which the identification number is printed on the paper sheet, and allocates a predetermined character when the character recognition is unsuccessful; and
        a digit shift judging unit that
            calculates a first matching ratio representing a ratio by which characters in the same digit in both a first identification number and a second identification number are matching, and
            judges that there exists a digit shift if the first matching ratio is lower than a predetermined reference value and number of digits in the first identification number exceeds number of digits in the second identification number;
        a number reducing unit that reduces number of digits of a character string composing the first identification number, by a number equal to an excess number of digits calculated by the digit shift judging unit, by cutting character strings of the digits from the first digit to right direction and the last digit to left direction;
        a second-matching ratio calculating unit that calculates a first-digit-cut second-matching ratio representing a ratio by which characters in the same digit in both a first-digit-cut first identification number obtained by cutting the character strings of the first identification number from the first digit to right direction and the second identification number are matching, and a last-digit-cut second-matching ratio representing a ratio by which characters in the same digit in both a last-digit-cut first identification number obtained by cutting the character strings of the first identification number from the last digit to left direction and the second identification number are matching; and
        a character determination unit that replaces the first identification number, when a higher one between the first-digit-cut second-matching ratio and the last-digit-cut second-matching ratio is equal to or higher than the predetermined reference value, by the first-digit-cut first identification number or the last-digit-cut first identification number that includes the higher of the second matching ratios, thereby determining the first identification number.

* * * * *